US005911070A

United States Patent [19]
Solton et al.

[11] Patent Number: 5,911,070
[45] Date of Patent: Jun. 8, 1999

[54] DEVELOPMENT SYSTEM WITH METHODS FOR BI-DIRECTIONAL APPLICATION PROGRAM CODE GENERATION

[75] Inventors: Randolph T. Solton, Berkeley; Lloyd Tabb, Santa Cruz, both of Calif.

[73] Assignee: Inprise Corporation, Scotts Valley, Calif.

[21] Appl. No.: 08/511,668

[22] Filed: Aug. 7, 1995

[51] Int. Cl.$^6$ .................................................. G06F 9/46
[52] U.S. Cl. ..................... 395/701; 395/702; 395/703; 395/704; 395/705
[58] Field of Search ................................. 395/701, 702, 395/703, 704, 705, 200.48; 364/280.7, 970, 977.1, 977.3, 280.4, 286, 286.3; 345/326, 349; 707/514

[56] References Cited

U.S. PATENT DOCUMENTS

| | | | |
|---|---|---|---|
| 4,710,763 | 12/1987 | Franke et al. | 345/10 |
| 4,733,354 | 3/1988 | Potter et al. | 706/924 |
| 4,821,211 | 4/1989 | Torres | 345/357 |
| 4,831,580 | 5/1989 | Yamada | 345/433 |
| 4,866,634 | 9/1989 | Reboh et al. | 706/60 |
| 4,912,669 | 3/1990 | Iwamoto et al. | 707/531 |
| 4,956,773 | 9/1990 | Saito et al. | 395/773 |
| 4,982,344 | 1/1991 | Jordan | 345/346 |
| 4,984,180 | 1/1991 | Wada et al. | 364/474.24 |
| 5,008,810 | 4/1991 | Kessel et al. | 707/506 |
| 5,047,960 | 9/1991 | Sloan | 707/507 |
| 5,091,868 | 2/1992 | Pickens et al. | 707/506 |
| 5,093,914 | 3/1992 | Coplien et al. | 395/704 |
| 5,179,652 | 1/1993 | Rozmanith et al. | 707/10 |
| 5,208,907 | 5/1993 | Shelton et al. | 707/505 |
| 5,265,206 | 11/1993 | Shackleford et al. | 395/683 |
| 5,327,562 | 7/1994 | Adcock | 395/708 |
| 5,339,433 | 8/1994 | Frid-Nielsen | 305/705 |
| 5,339,438 | 8/1994 | Conner et al. | 395/705 |
| 5,361,350 | 11/1994 | Conner et al. | 395/672 |
| 5,371,891 | 12/1994 | Gray et al. | 395/705 |
| 5,481,708 | 1/1996 | Kukol | 395/709 |
| 5,487,141 | 1/1996 | Cain et al. | 345/435 |

FOREIGN PATENT DOCUMENTS 0 211 151 A2   2/1987   European Pat. Off. ........ G06F 15/20

OTHER PUBLICATIONS

*Microsoft Visual Basic Version 3.0 Programmer's Guide, Chapter 2: Your First Visual Basic Application*, Microsoft Corp., 1993, pp. 15–30.

Gehani, N., *High Level Form Definition in Office Information Systems*, The Computer Journal, vol. 26, No. 1, Feb. 1983, pp. 52–59.

Shu, Nan C., *Visual Programming*, Van Nostrand Reinhold Company, 1988, pp. 16–31, 142–147, 150–151, 202–209, 222–229, 234–237, 264–283.

Smith, David N., *Visual Programming in the Interface Construction Set*, IEEE, 1988, pp. 109–120.

Pezold, C., *Dynamic Data Exchange (DDE)—Chapter 17*, Programming Windows, Second Edition, Microsoft Press, 1990, pp. 809–840.

Linthicum, D., *RADical Development*, PC Magazine, Nov. 8, 1994, pp. 153–157, 162, 168, 170, 174, 176, 183–184, 188–193, 195, 198, 203–205, 209–210.

(List continued on next page.)

*Primary Examiner*—Thomas R. Peeso
*Assistant Examiner*—Cuong H. Nguyen
*Attorney, Agent, or Firm*—John A. Smart

[57] ABSTRACT

Development system with visual designer tools (Designers) are described for generating and modifying program code. During system operation, a user employs the Designers to visually create an application program and generate a source file. Moreover, the user can proceed to edit the file with a text editor and then return to the Designers to edit the form visually. Each Designer is a bi-directional or "two-way" tool: the user can modify a form either visually with a Designer, or by editing the generated code in a source (text) file with a text editor. The user can use both techniques interchangeably—switching at will. All changes which occur in Designers are reflected in the generated code and vice versa.

30 Claims, 17 Drawing Sheets

OTHER PUBLICATIONS

Merriam, Rud, *Drag & Drop*, Windows Tech Journal, Jan. 1992, pp. 79–80.

Shepard et al., *A Visual Software Process Language*, Communications of the ACM, vol. 35, No. 4, Apr. 1992, pp. 37–44.

Butterworth, M., *Forms Definition Methods*, 5th Annual Conference on Computers and Communication, Mar. 1986, pp. 708–712.

Miyao et al., *Visualized and Modeless Programming Environment for Form Manipulation Language*, IEEE, 1989, pp. 99–104.

DeMaria, Rusel & Fontane, George, *Working With dBase Mac*, Brady Books, 1988, pp. 94–134, 135, 155–183.

Linthicum, D., *Defending OOP with VisualAge*, DBMS, Aug. 1994, pp. 22, 24, 75.

Varhol, Peter, *Visual Programming's Many Faces*, BYTE, Jul. 1994, pp. 187–188.

Mandelkern, D., *Visual Programming*, Object Magazine, Sep.–Oct. 1992, pp. 39–43.

Chin, et al., *Distributed Object–Oriented Programming Systems*, ACM Computing Surveys, vol. 23, No. 1, Mar. 1991, pp. 91–124.

Liu, et al., *Microcomputer Systems: The 8086/8088 Family*, Prentice–Hall, 1986, pp. 26–39 and 155–160.

Hultquist et al., "SuperGlue: A Programming Environment for Scientific Visualization", Proceedings visualization '92, pp. 243–250, Oct. 1992.

Grundy et al., "Constructing Multi–View Editing Environments Using MViews", Proceeding 1993 IEEE Symposium on visual Languages, pp. 220–224, Aug. 1993.

Hirakawa et al., "Advances in Visual Programming", ICSI '92 Proceedings of the Second International Conference on Systems Integration, pp. 538–543, Jun. 1992.

Adar et al., "A System Supporting Design, Implementation and Maintenance of Object Oriented Programs", IEEE Proceedings of the Fifth Israel Conference on Computer Systems and Software Engineering, pp. 104–112, May 1991.

Ha, Soo Cheol, "A Visual Tool for C++Program Development", Proceedings TENCON '93, IEEE Region 10 Conference on Computer, Communication, Control and Power Engingeering, pp. 280–283, Oct. 1993.

Ford et al., "Interacting Visual Abstractions of Programs", Proceedings 1993 IEEE Symposium on Visual Languages, pp. 93–97, Aug. 1993.

Ng et al., "A Visual Concurrent LISP Environment and its Application", Proceedings ICCI '92 Fourth International Conference on Computing and Information, pp. 114–117, May 1992.

```
*  This is my first dBASE form.
** END HEADER -- do not remove this line*
*
LOCAL f
f  =  NEW HELLO()
f.Open()
CLASS HELLO OF FORM
        this.MousePointer   =        1
        this.ColorNormal    =   "N/GB"
        this.Text    =   "My First dBASE Form"
        this.Width   =        40.00
        this.Top     =         5.69
        this.Left    =               9.75
        this.Height  -              15.00
        this.Minimize    =   .F.
        this.Maximize    =   .F.
        this.HelpFile    =   ""
        this.HelpID      =   ""
        DEFINE TEXT TEXT1 OF THIS;
            PROPERTY;
               MousePointer                0,;
               ColorNormal    "N/GB",;
               Text "Hello World1",;
               Width         25.00,;
               Top            2.00,;
               Left           8.00,;
               Height         4.00,;
               Border   .F.,;
               FontItalic  .T.,;
               FontSize    24.00
        DEFINE PUSHBUTTON BUTTON1 OF THIS;
            PROPERTY;
               OnClick   CLASS::BUTTON1_ONCLICK,;
               ColorNormal    "N/W",;
               MousePointer                0,;
               Text   "GoodBye",;
               Width          13.00,;
               Top             8.00,;
               Left           13.00,;
               Height          3.00.;
               FontSize       10.00,;
               Default   .T.
        Procedure BUTTON1_OnClick
             DO WHILE form.Height > 0 .and. form.Width > 0
                  form.Text1.Text  =   "GoodBye1"
                  form.Height  =  form.Height  -   1
                  form.Width   =  form.Width   -   1
                  form.Top   =   form.Top   +   .5
                  form.Left  =   form.Left  +   .5
                  DO MakeSomeNoise
             ENDDO
             form.Close()
             RETURN
    ENDCLASS
PROCEDURE MakeSomeNoise
        ? CHR(7)
        RETURN
```

- 410: * This is my first dBASE form. ... *
- 400
- ASSIGN PROPERTIES
- DEFINE CONTROL
- 420
- EVENT HANDLER
- 430

*FIG. 4A*

```
**  END HEADER -- do not remove this line*
*
                                                                460
Parameter FormObj
SET PROCEDURE TO PROGRAM(1) ADDITIVE
NEW MYMENU(FormObj, "Root")

CLASS MYMENU(FormObj,Name) OF MENU(FormObj,Name)
        this.Text   =   ""
        DEFINE MENU FILE OF THIS;
            PROPERTY;
                Text   "File"      ←────────────  USE USER
            DEFINE MENU OPEN OF THIS.FIL.E;        INPUT TO NAME
                PROPERTY;                          OBJ. REFERENCE
                    Text "Open"
            DEFINE MENU SAVE OF THIS.FILE;
                PROPERTY;
                    Text "Save"
            DEFINE MENU SAVE_AS OF THIS.FILE;
                PROPERTY;
                    Text "Import"
                DEFINE MENU TEXT_FILE OF THIS.FILE IMPORT;
                    PROPERTY;
                        Text "Text file"
                DEFINE MENU SOUND OF THIS.FILE.IMPORT;
                    PROPERTY;
                        Text "Sound"
                DEFINE MENU BITMAP OF THIS.FILE.IMPORT;
                    PROPERTY;
                        Text "Bitmap"

DEFINE MENU EDIT OF THIS;
            PROPERTY;
                Text "Edit"
            DEFINE MENU CUSTOMERS OF THIS.EDIT;
                PROPERTY;
                    Text "Customers"
            DEFINE MENU ORDERS OF THIS.EDIT;
                PROPERTY;
                    Text "Orders"
            DEFINE MENU LINE_ITEMS OF THIS.EDIT;
                PROPERTY;
                    Text "Line items"
            DEFINE MENU HELP OF TIHS;
                PROPERTY;

Text "Help"
ENDCLASS
```

470 brackets the top section (header area)
480 brackets the CLASS...ENDCLASS section

FIG. 4B

PUSHBUTTON PROPERTY TABLE 700

| NAME | VALUE | PTR TO MEMBER FUNCTION | FLAGS |
|------|-------|------------------------|-------|
| COLOR | "RED" | XXX | ... |
| TEXT | "Ok" | YYY | ... |
| LEFT | "1" | ZZZ | ... |
| ... | ... | ... | ... |

*FIG. 7*

DEVELOPMENT SYSTEM WITH METHODS FOR BI-DIRECTIONAL APPLICATION PROGRAM CODE GENERATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computer systems and, more particularly, to systems and methods for automating the task of developing application programs.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program which is written in the high-level language is called the "source code" or source program. The low-level or machine language, on the other hand, comprises "object code." Once created, object code (e.g., .obj file) is a separate program in its own right—it includes instructions which may be executed by the target microprocessor. In practice, however, the object code is usually first linked (i.e., combined) with other object code or libraries, which include standard routines.

Compilers are fundamental to modem computing. Translating human-oriented programming languages into computer-oriented machine languages, compilers allow computer programmers to ignore the machine-dependent details of machine language. Instead of focusing on the register set or memory architecture of a particular computer, for instance, one may simply concentrate on solving the problem at hand. Thus, high-level languages are "portable," that is, they afford a level of abstract which permits a single program to be implemented on several different machines, including ones of vastly different architecture.

The task of handcrafting source code suitable for compilation into a program by a compiler has always been a labor-intensive chore. Accordingly, there has been much interest in improving the process. A particularly popular approach to this problem is to use "application generators" or "code generators." These are programs which generate basic source code for application programs. Examples include Borland's AppExpert, Microsoft AppWizard, and Borland's dBASE AppGen. Typically, a developer user provides such a tool with some initial input, for indicating the type of application program desired. The type of programs desired may include, for instance, a 16-bit Windows application with OLE (Object Linking and Embedding) capability and an MDI (Multiple Document Interface) interface. Based on these inputs, a typical application generation tool would generate complete source code for a working program which includes the attributes specified by the user. The program generated is essentially a "shell" program— that is, a bare-bones program which lacks core functionality for completing end user tasks. Thus, conventional application generators automate the task of writing the "boilerplate" code, which is necessary to get a program at least up and running.

In addition to receiving information regarding a particular type of application desired, application or code generators can also create source code in response to developer user input which "paints" an interface. Such a tool, such as Protogen™, allows the user to visually create an interface, using standard drag-and-drop methodology. After the interface is created, the developer user instructs the tool to generate the source code for the application program. In response, the application generation tool generates source code text files which include the necessary code for recreating and operating the user interface.

After the user has generated the shell program, he or she proceeds to add specific functionality to the program, using conventional coding techniques. The user may, for instance, write functions or procedures which operate in response to user selection of choices from a menu bar. The basic code for displaying the menu bar and getting end user choices was generated by the application generator. The developer user retrieves this code into a program editor and adds additional routines or functions for carrying out the application programs functionality which is to operate in response to end user selection of menu choices.

Although conventional application generators clearly facilitate the task of creating programs, they have a distinct disadvantage. In particular, these tools are all monolithic or "one-way" tools. Once the user has generated the source code for the application program and then modified it to include his or her functionality, the user cannot "go back" to the application generator to regenerate the code. If the user forgot to add a particular menu choice to the menu bar while he or she was visually "painting" the interface, he or she cannot return to the application generator to visually add this to the application program once the generated code has been modified by the developer user. Quite simply, conventional application generation tools do not understand the modifications added by the developer user. In other words, conventional application generation tools are very adept at generating the boilerplate code which is necessary for creating application programs; they are not adept, however, at understanding changes made to that boilerplate code once the user has begun editing the shell program for converting it into a "real" application program.

What is needed are system and methods for bi-directional application generation—that is, visual code generation tools which generate a source file, allow a user to edit the file with a text editor, then return to the visual code generation tool to further edit the form visually. More particularly, such a system should provide the developer with the ability to use both visual and text editing techniques interchangeably—switching at will. The present invention fulfills this and other needs.

SUMMARY OF THE INVENTION

The present invention comprises a development system with visual designer tools (Designers) for generating and modifying program code. During system operation, a user employs the Designers to visually create an application program and generate a source file. The user can proceed to edit the file with a text editor and then return to the Designers at any time to edit the form visually. Each Designer is a bi-directional or "two-way" tool: the user can modify a form either visually with a Designer, or by editing the generated code in a source (text) file with a text editor. The user can use both techniques interchangeably—switching at will. All changes which occur in Designers are reflected in the generated code and vice versa.

Providing bi-directional code generation requires a whole new approach to the process of creating programs. Bi-directional code generation requires a language representation which is easily understood by the designer module (which is responsible for visual design) yet also easily understood by the language processor or compiler (which is responsible for generating the final program by compiling the source code files). According to the present invention, language representation which supports bi-directional code generation is provided in the design of the objects themselves which are employed in programs. In other words, the approach to implementing bi-directional code generation is not to change the designer or compiler, therefore, but instead to change the basic nature of the objects themselves in the system.

According to the present invention, a communication path is adopted which "runs" all operations through the objects themselves. Although Designers appear to be operating on the objects of a visual form, they are, in fact, instead operating directly on the objects themselves. When the user adds objects to a form, he or she is given the illusion of being able to add objects directly to the form. What is happening instead is that the system, in response to these user inputs, is building objects in the background (i.e., in-memory program objects). The side effect of building those objects is that display methods of those objects are invoked for supporting an on-screen representation of those objects in the design session. The effect of operating directly on the object is that modifications to the objects manifest any changes to the objects themselves. Thus, a design session is simply one view of the objects, while run time execution of the underlying program (form) is another view of the objects. The source file generated for storing the program is yet just another view of the objects.

After the user has completed visual design of the objects, a collection of objects has been created. Each object includes methods which support streaming the object itself to disk. When a user saves a form during a design session, the system sends a message "stream yourself" to the objects. In conjunction with a Streamer object, the objects operate to stream themselves to a source file. The source file may be compiled by a compiler and executed by the system. When the user wishes to further modify the form visually, the source file (i.e., a collection of objects which were streamed out) is again run for reinstantiating those objects. The result is that a form appears on screen. In design mode, however, after the objects begin execution, they are additionally instructed to enter their design state (i.e., "design yourself").

BRIEF DESCRIPTION OF THE DRAWINGS

FIG. 4A is diagram illustrating basic layout of a generated source file (dBASE .WFM file in a preferred embodiment).

FIG. 4B is a diagram illustrating basic layout of a generated source file for saving menu information.

FIG. 7 is a diagram illustrating a property table or grid employed in the system of the present invention.

DETAILED DESCRIPTION OF A PREFERRED EMBODIMENT

System Components

Figure 1A:
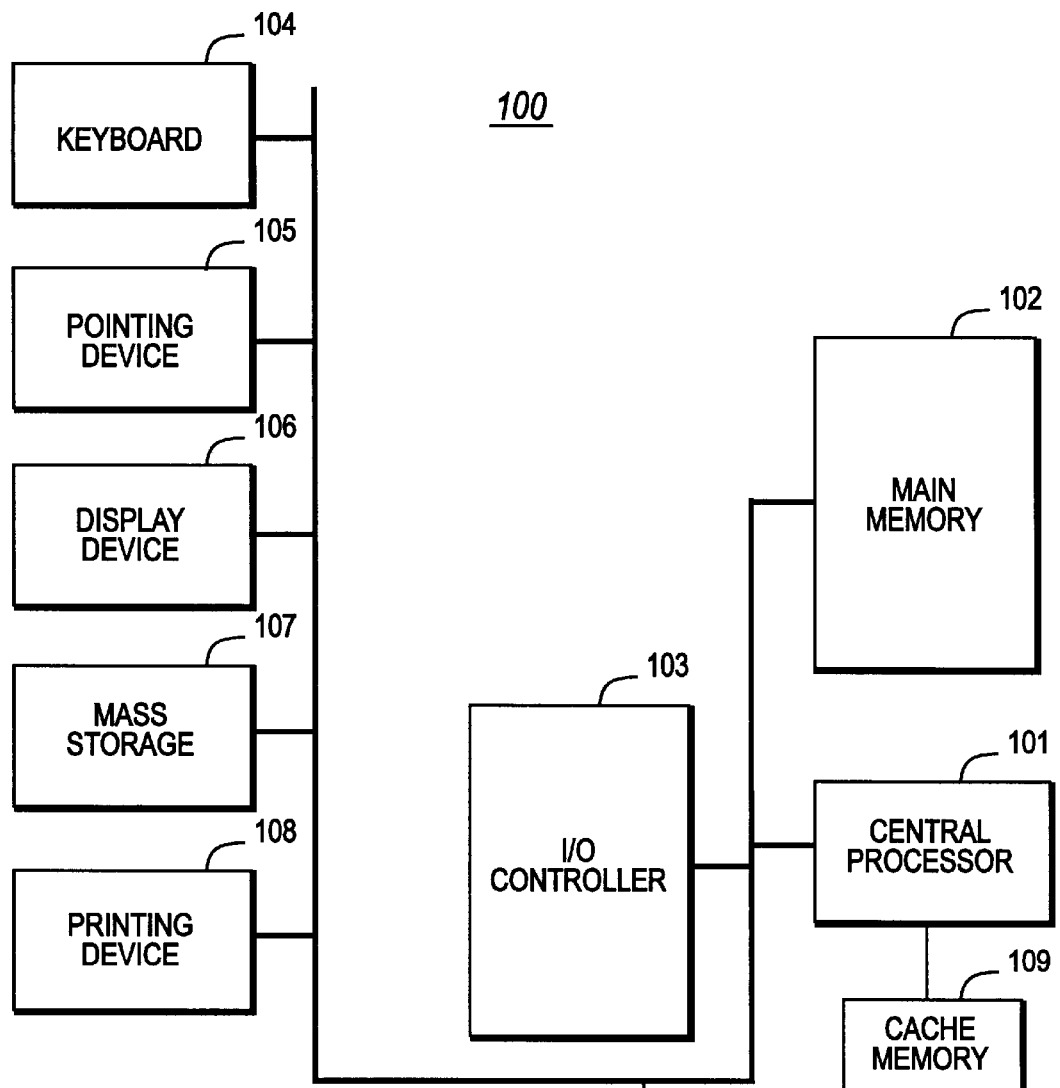
FIG. 1A is a block diagram of a computer system in which the present invention may be embodied.

The present invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture.

Figure 1B:
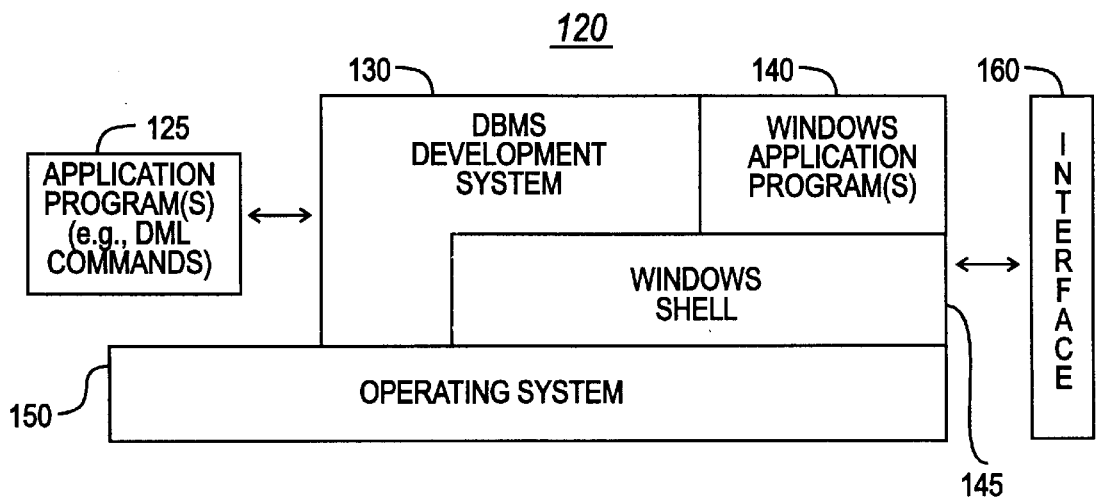
FIG. 1B is a block diagram of a software subsystem for controlling the operation of the computer system of FIG. 1A.

Illustrated in FIG. 1B, a computer software system 120 is provided for programming and operating the computer system 100. Software system 120, which is stored in system memory 102 and on disk memory 107, includes a kernel or operating system 150, a windows shell 145, and a Database Management System (DBMS) Development System 130. OS 150 is the executive or supervisor for the system 100, directing both task management and data management. DBMS Development System 130, on the other hand, includes a software subsystem for storing, retrieving, and manipulating information in database tables, and for developing application programs (e.g., programs 125). Under the command of DBMS Development System 130, the system 100 receives user commands and data through user interface 160. The interface 160 includes a command editor for processing system information, as described in further detail below. Additional application programs, such as DML (Data Manipulation Language) command programs 125 (for further controlling the operation of DBMS 130) or windows application software 140, may be "loaded" (i.e., transferred from storage 107 into memory 102) for execution by the system 100.

In a preferred embodiment, the system 100 includes an IBM-compatible personal computer, available from a variety of vendors (including IBM of Armonk, N.Y.). Operating system 150 includes MS-DOS, and Windows shell 145 is Microsoft® Windows; both are available from Microsoft Corporation of Redmond, Wash. DBMS Development System 130 preferably includes Visual dBASE® DBMS (available from Borland International of Scotts Valley, Calif.). The DBMS Development System 130 also includes two-way design tools, which are described in further detail below. If desired, other operating systems and/or DBMSs (or alternative configurations thereof) may be employed in accordance with the principles of the present invention.

Interface

A. Introduction

The following description will focus on the presently preferred embodiments of the present invention, which are embodied in a database development system operative in the Microsoft® Windows environment. The present invention, however, is not limited to any particular application or any particular environment. Instead, those skilled in the art will find that the system and methods of the present invention may be advantageously applied to a variety of system and application software, including electronic spreadsheet systems, wordprocessors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
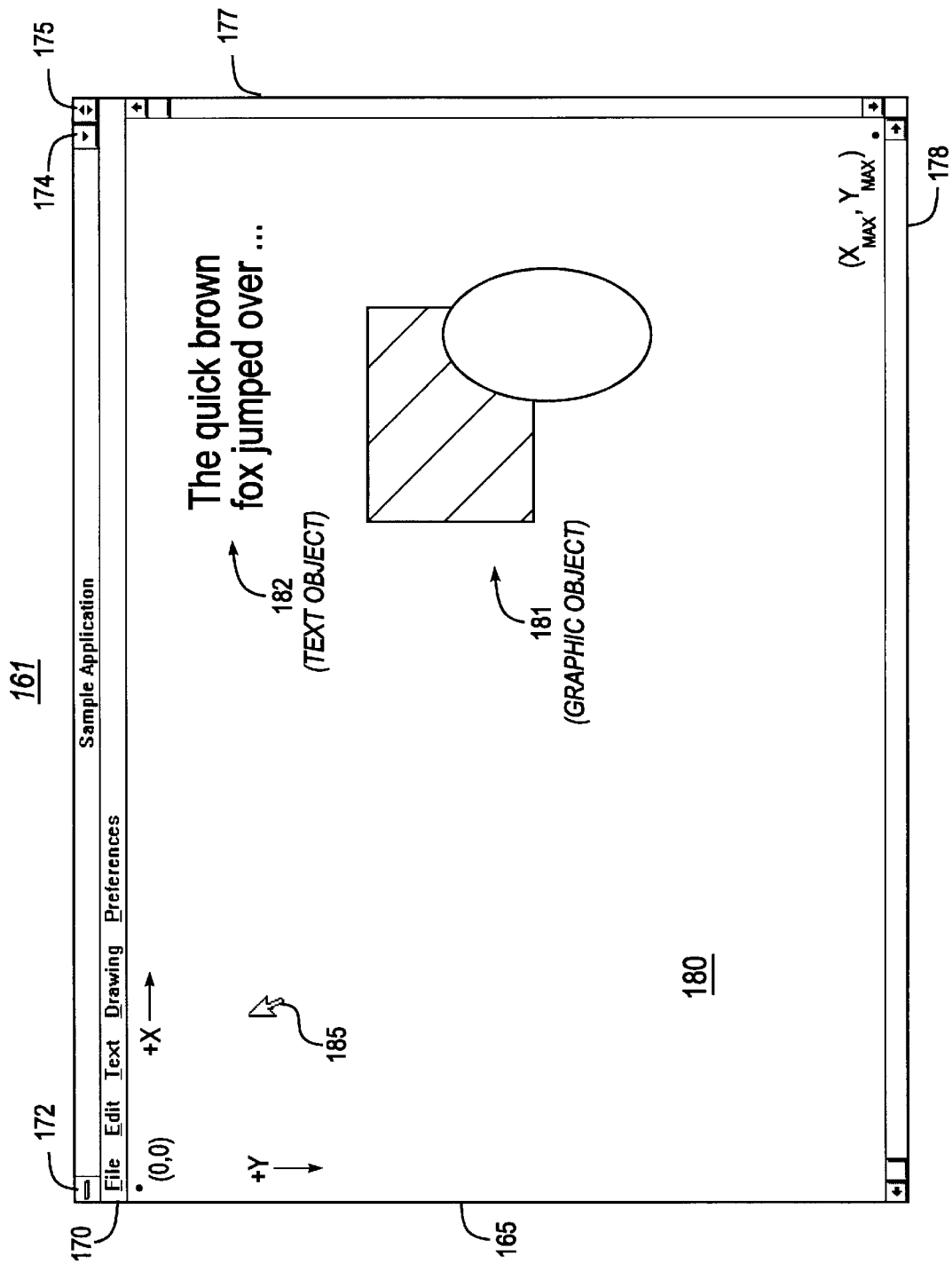
FIG. 1C is a bitmap screen shot illustrating a preferred graphical user interface (GUI) of the software subsystem of FIG. 1B.

In a preferred embodiment, the system 100 includes as the interface 160 a windowing interface or work space 161, as shown in FIG. 1C. Window 161 is a rectangular, graphical user interface (GUI) for display on screen 106; additional windowing elements may be displayed in various sizes and formats (e.g., tiled or cascaded), as desired. At the top of window 161 is a menu bar 170 with a plurality of user-command choices, each of which may invoke additional submenus and software tools for use with application objects. Window 161 includes a client area 180 for displaying and manipulating screen objects, such as graphic object 181 and text object 182. In essence, the client area is a work space or viewport for the user to interact with data objects which reside within the computer system 100.

Windowing interface 161 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 161 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art; see, e.g., Petzold, C., *Programming Windows*, Second Edition, Microsoft Press, 1990. The disclosures of each are hereby incorporated by reference.

B. User Interface

1. Development System Desktop

Figure 2A:
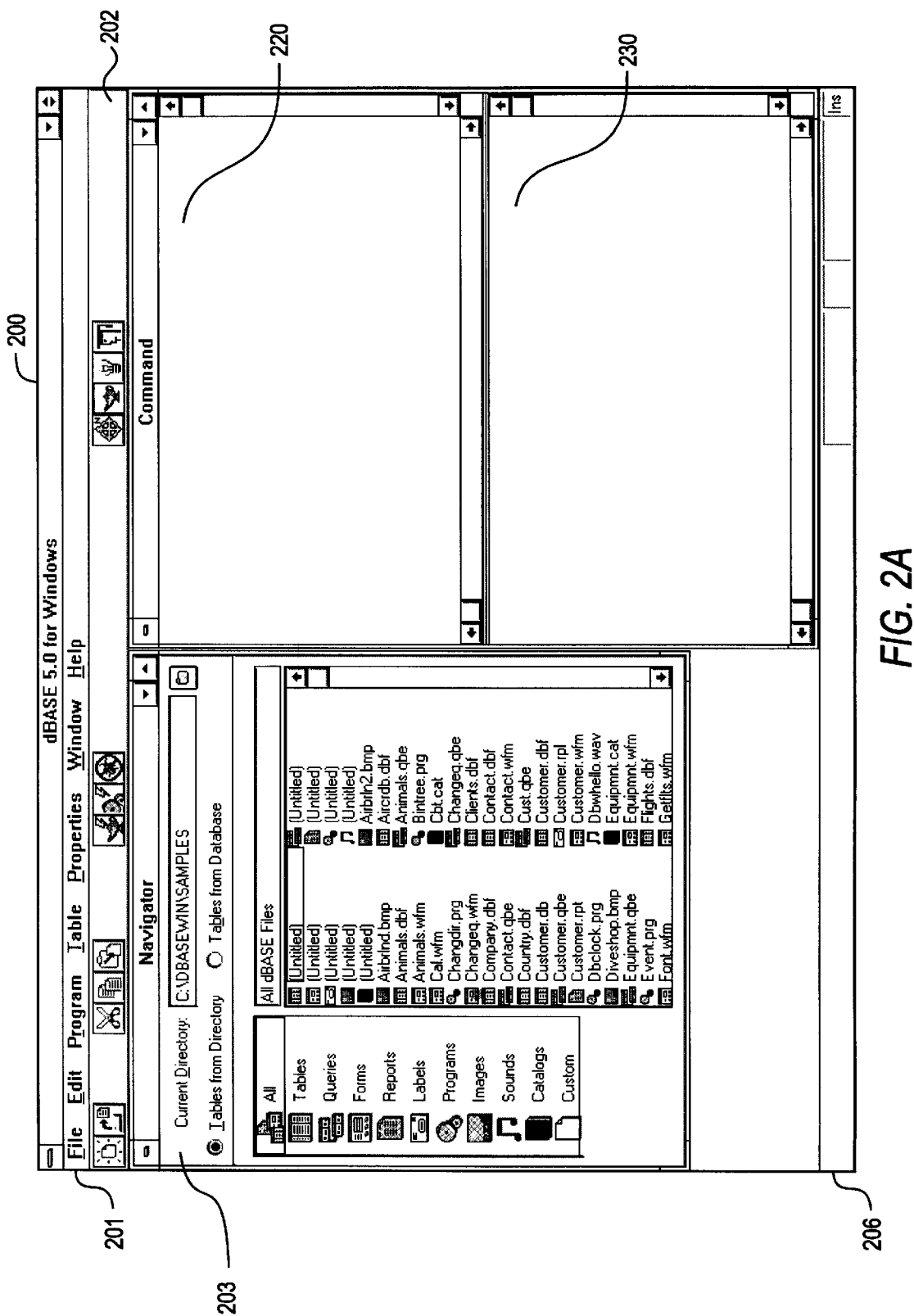
FIG. 2A is a bitmap screen shot illustrating a preferred interface of the system of the present invention for developing application programs.

Shown in FIG. 2A, a preferred interface for the Database Development System 130 of the present invention will now be described. The interface comprises a Desktop 200 having a main menu 201, a toolbar 202, a File Viewer or "Navigator" Window 203, a Command Window 220, a Command Results Window 230, and a status line 206. The menu bar 201 displays and invokes, in response to user inputs, a main level of user commands. Menu bar 201 also invokes additional pulldown menus, as is known in windowing applications. The Desktop 200, File Viewer 203, Command Window 204, and Command Results Window 230 all have control-menu boxes, and minimize and maximize buttons, as is known in windowing applications. Status line 206 indicates the current status of the development system including, for example, the name of a database table being processed.

The toolbar 202 comprises a row of tool icon buttons which provide a quick way for users to choose commonly-used menu commands or properties. The toolbar is a dynamic object in the sense that only the tools available in a given context are displayed. For instance, the editing tool icons will not appear unless the user is editing.

The File Viewer 203 includes edit boxes for entering file names and paths in order to display tables, forms, program source code, and the like. The user can enter a particular file name or, alternatively, select from a list of files that meet some user-supplied criterion. For example, by clicking on the "Tables" icon, the File Viewer will display all table names (e.g., files with extension .DBF or .DB) in the current directory. Clicking on a particular target table name will then open and display that table. Other selectable file types are All, Queries, Forms, Reports, Labels, Programs, Images, Sounds, and Catalogs. These selections are also available via user commands accessible from the main menu bar 201.

2. Command Interface

Commands for directing operation of the system are entered in the Command Window 220, which is a scrollable edit window that accepts user input for creating a sequence of commands. Commands can be any sequence of expressions, assignments, function calls, and the like, as mandated by a target language. In an exemplary embodiment, the target language is the dBASE® Language for manipulating database information. To aid the user in command entry, immediate feedback of the result (or "return value") of each command entered in the Command Window 220 is displayed concurrently in the Command Results Window 230. The Command Results Window 230 is a scrollable, edit-style window which typically appears below the Command Window. The Command Window 220 can also be moved and resized, or maximized to the size of the Desktop, all without affecting the basic editing methods.

Program Development

A. Form Designer

Figure 2B:
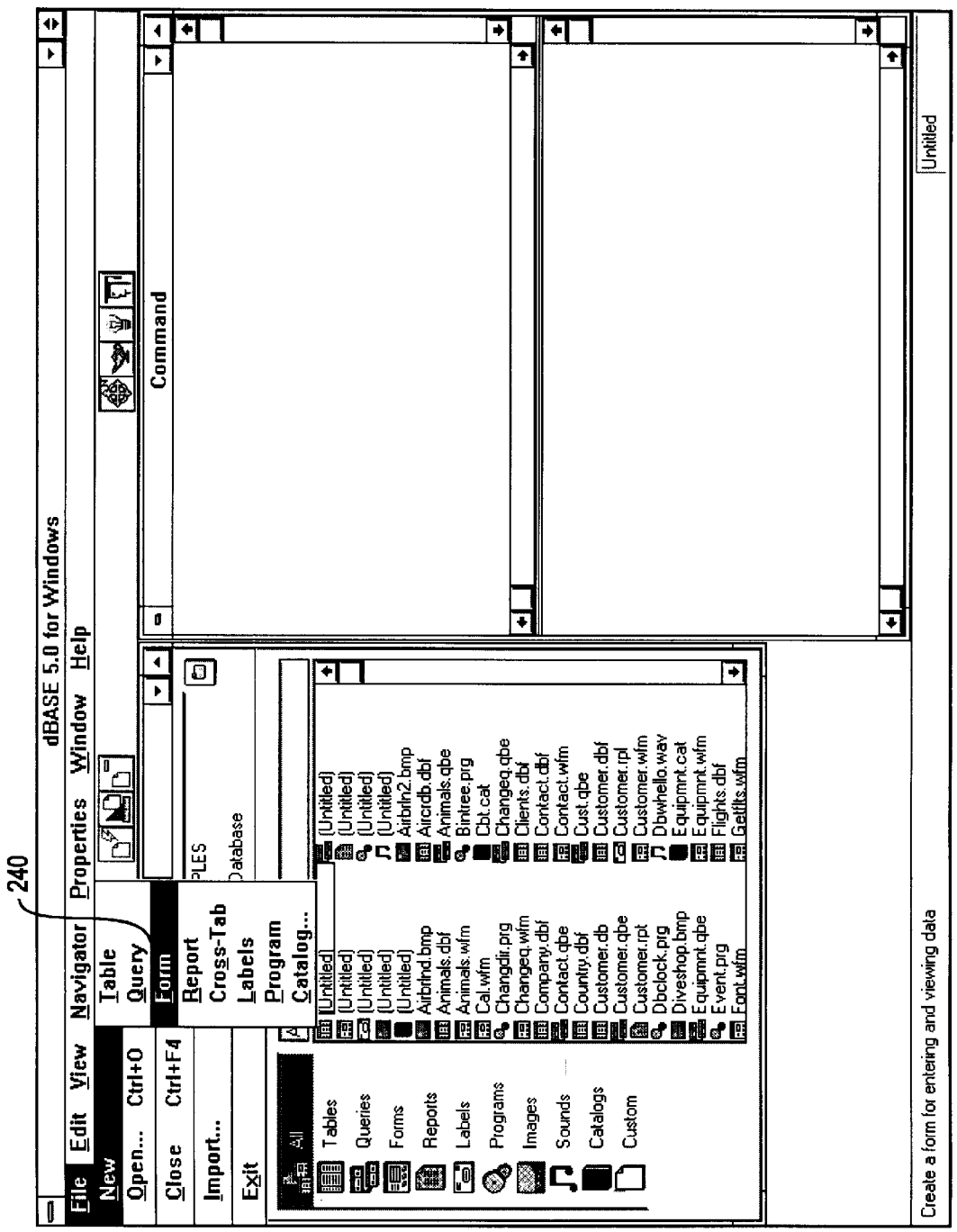
FIGS. 2B–C are bitmap screen shots illustrating use of the interface for creating a new form.
Figure 2C:
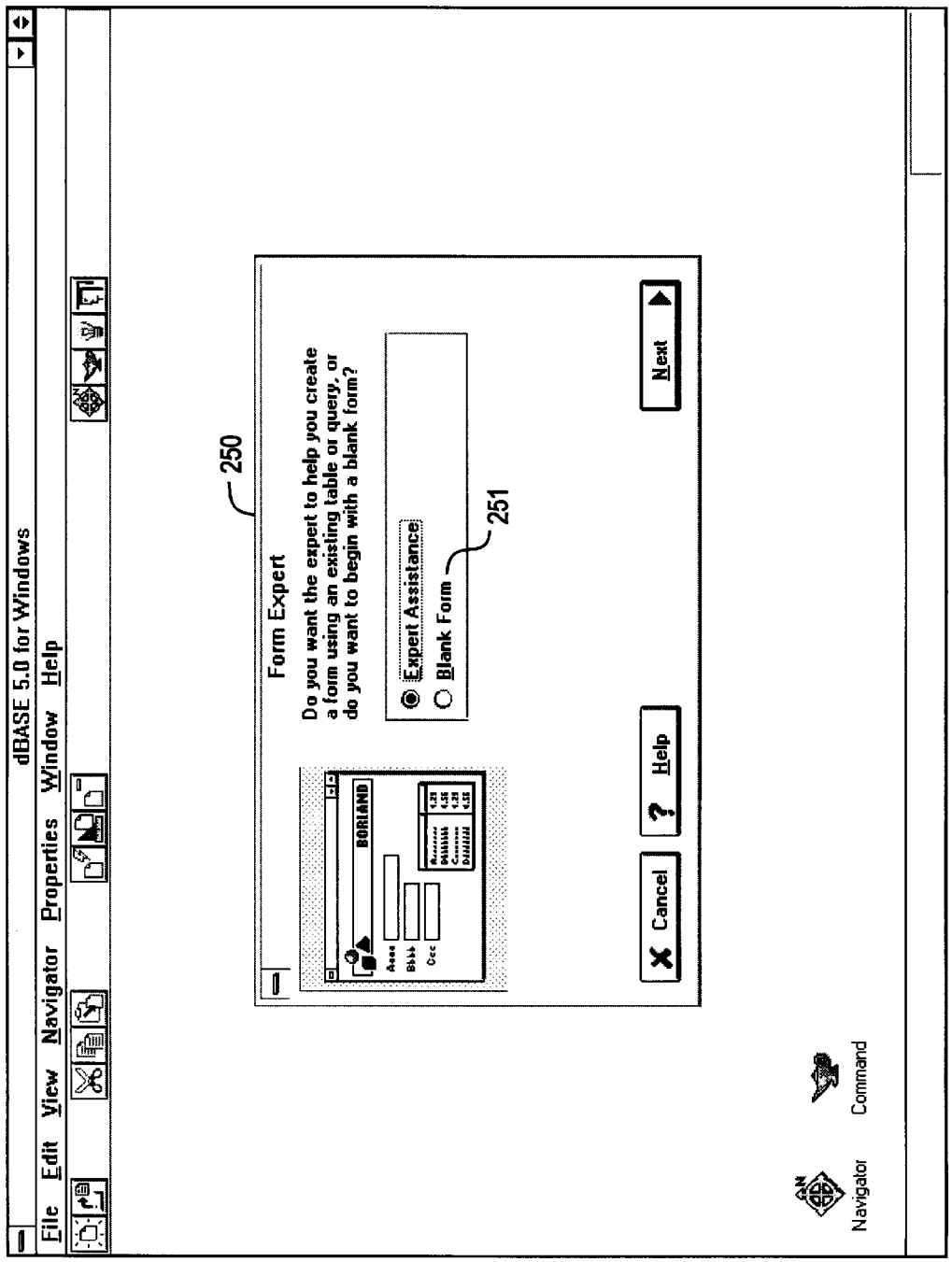

Although the system may be operated interactively using the Command Window 220, users will typically create application programs for operating the system. Application programs are created using a form-based visual programming environment or "Form Designer." To invoke the Form Designer, the user selects a "Form" menu choice 240 from the menu bar (i.e., menu bar 201 of FIG. 2A), as shown in FIG. 2B. Before displaying the Form Designer, the system first displays a Form Expert 250, as shown in FIG. 2C. Here, the user can request assistance with creating a form, or choose to simply start with a blank form. For the example at hand, the user will simply choose "blank form" 251, thereby bypassing the Form Expert.

Figure 3A:
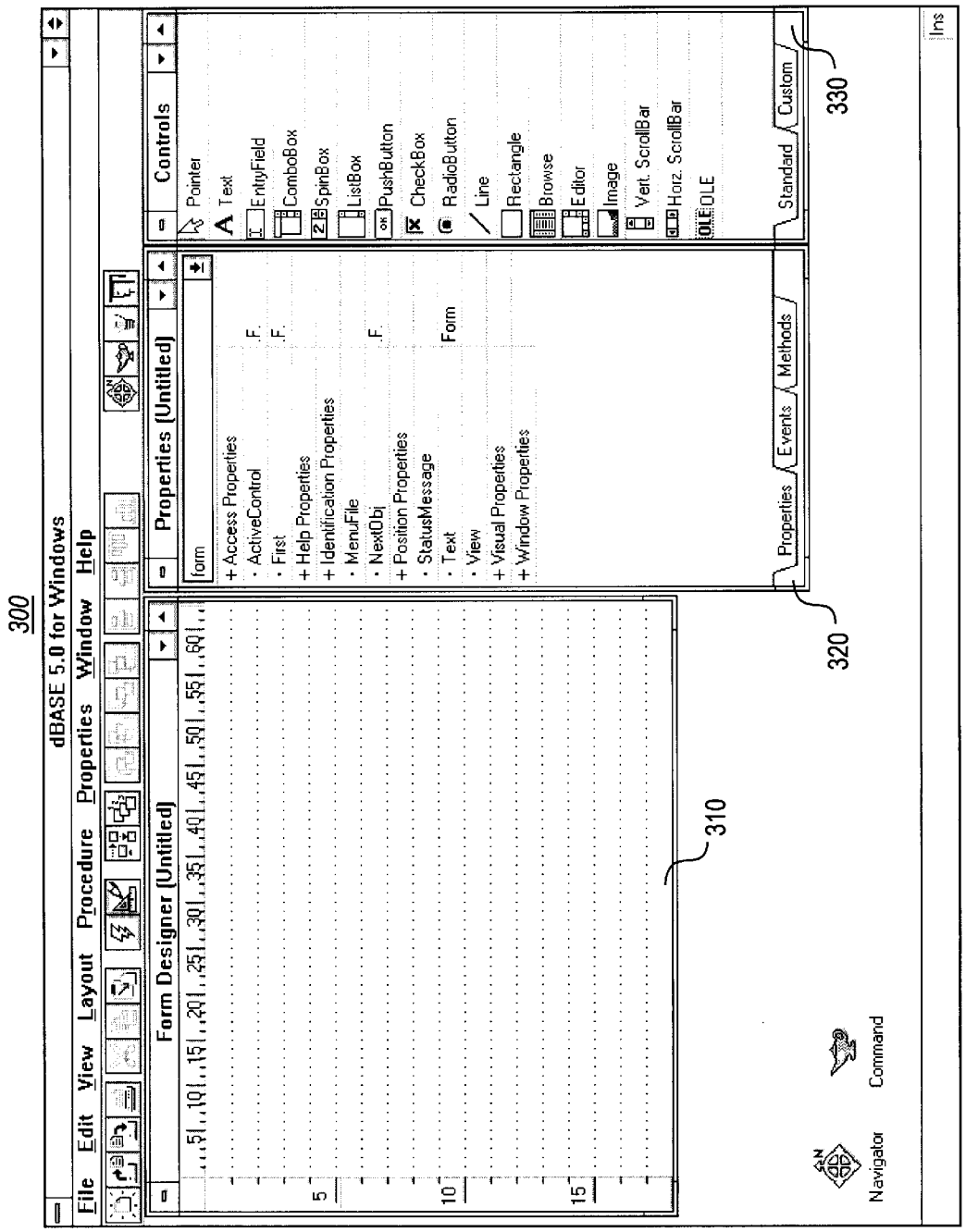
FIGS. 3A–F are bitmap screen shots illustrating a Form Designer of the present invention and accompanying tools (Property Inspector, Control Palette, and Procedure Editor).

Next, the system displays at the interface a Form Designer 300, as shown in FIG. 3A. As illustrated, when the user creates a form with the Form Designer, he or she is presented with a design surface which includes an empty form window (e.g., form 310). The Form Designer presents the user with a design surface composed of a window, a grid, and rulers, thus serving as the background of the form. Here, the user can set the size of the form window, place controls on the design surface in the positions he or she wants them to appear on the form, set the sizes of the controls, and specify the visual layers of the controls, along with the tabbing order of those controls that can receive focus. Into the empty form, the user can select and place objects, such as entry fields, list boxes, check boxes, and the like. Thus designing forms is as simple as arranging objects in a window. The objects can be manipulated using conventional graphical user interface methodology, including selecting, moving, sizing, and the like. When design is complete, the form may be "run." When running, forms are application programs: they display messages and data, respond to user input, and provide interactive controls such as menus, pushbuttons, and scroll bars. Using forms, therefore, the user can build a simple data entry application (e.g., based on one or more database tables), or build a complete user interface for a complex application.

Figure 3B:
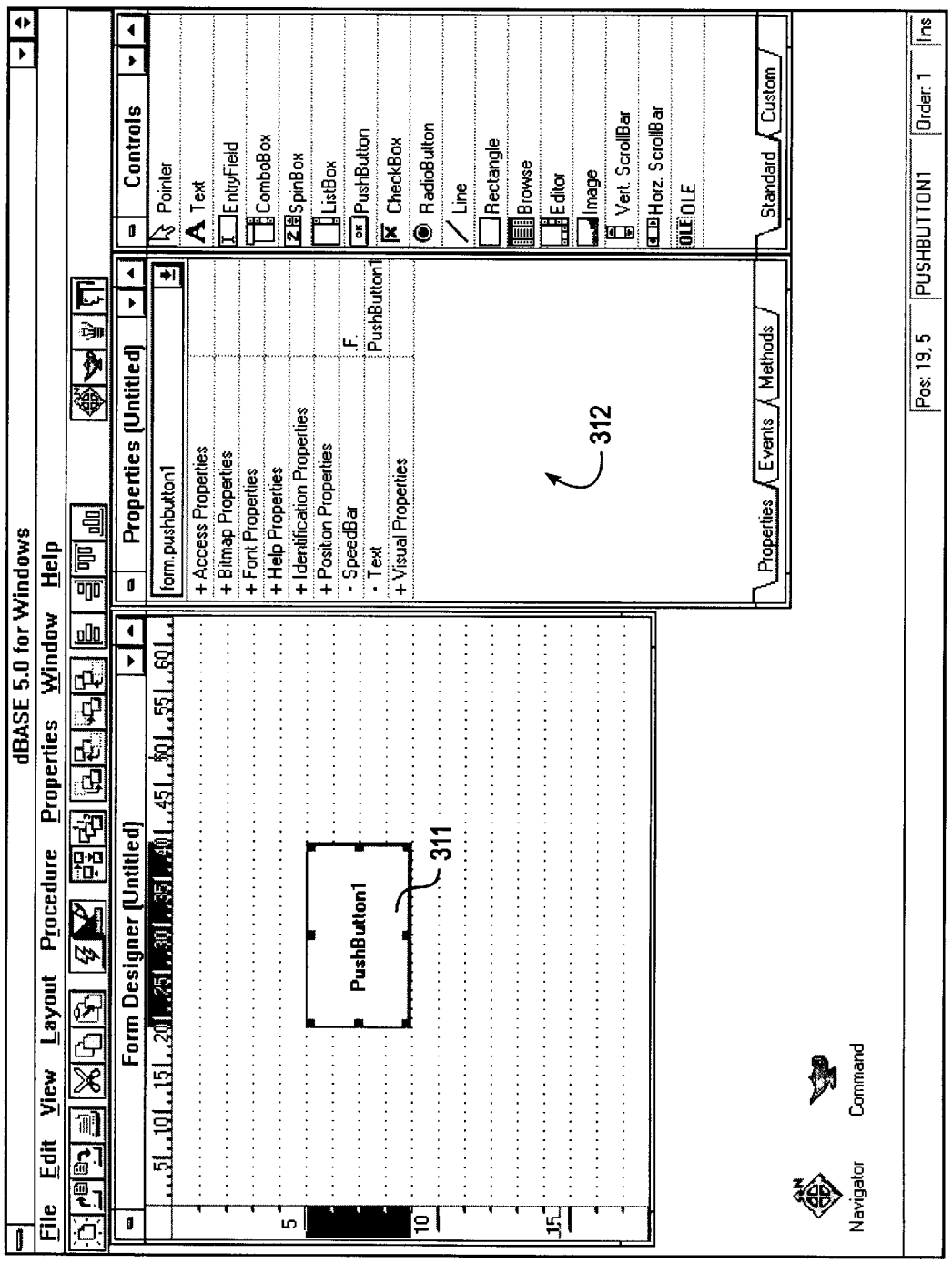

The user creates the basic user interface by selecting controls from a Control Palette 330 and placing them on the form. The Control Palette has two pages: Standard and Custom. The standard controls include control types of pushbutton, radio button, check box, line, text object, entry field, OLE object, combo box, list box, and the like. Custom controls can be custom dBASE controls (which have a .CC file-name extension) or custom Microsoft Visual Basic (.VBX) controls. To add a control to the form, the user selects clicks on the control on the palette to select it. When the pointer passes over the design surface, the pointer turns into cross hairs. The user clicks and drags the pointer across the design surface until the control is the desired size; or the user can click the design surface (without dragging) to add a control in a default size. FIG. 3B illustrates the placement of a pushbutton 311.

The user sets the properties of the components or objects on the form to customize their characteristics and behavior. In a preferred embodiment, this is done interactively using Properties Dialog or Object Inspector 320, shown in FIG. 3A. An Object Inspector is a window that displays the properties, events, and methods for the current object. The properties, events, and methods are displayed on separate tabbed pages; the user clicks the tab at the bottom of the inspector to display the page whose name is on the tab. "Properties" or attributes define an object's characteristics, such as its size, location, and color. In essence, properties are memory variables that contain data about an object. In FIG. 3B, the properties for the pushbutton 311, for instance, are shown in the Inspector Dialog at 312.

Figure 3C:
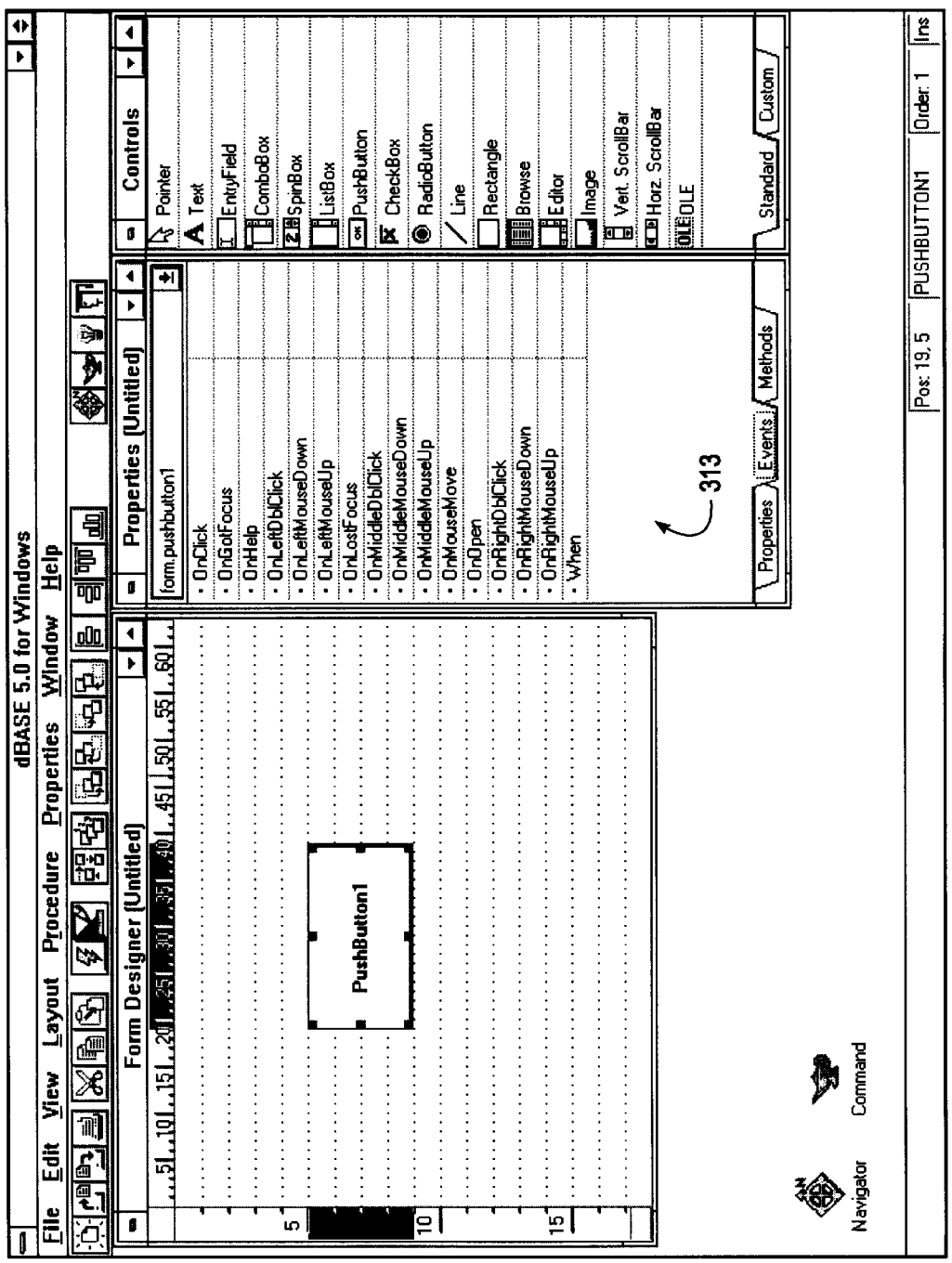

"Events" or event properties determine an object's behavior—that is, how it responds to events, such as mouse clicks and key strokes. The user can specify what happens when an event occurs by linking a "code block" or a procedure to the relevant event property. This code creates an event handler. In other words, an event handler is a subroutine that executes automatically when a particular event occurs. In FIG. 3C, the event properties for the pushbutton 311, for instance, are shown in the Inspector Dialog at 313.

Figure 3D:
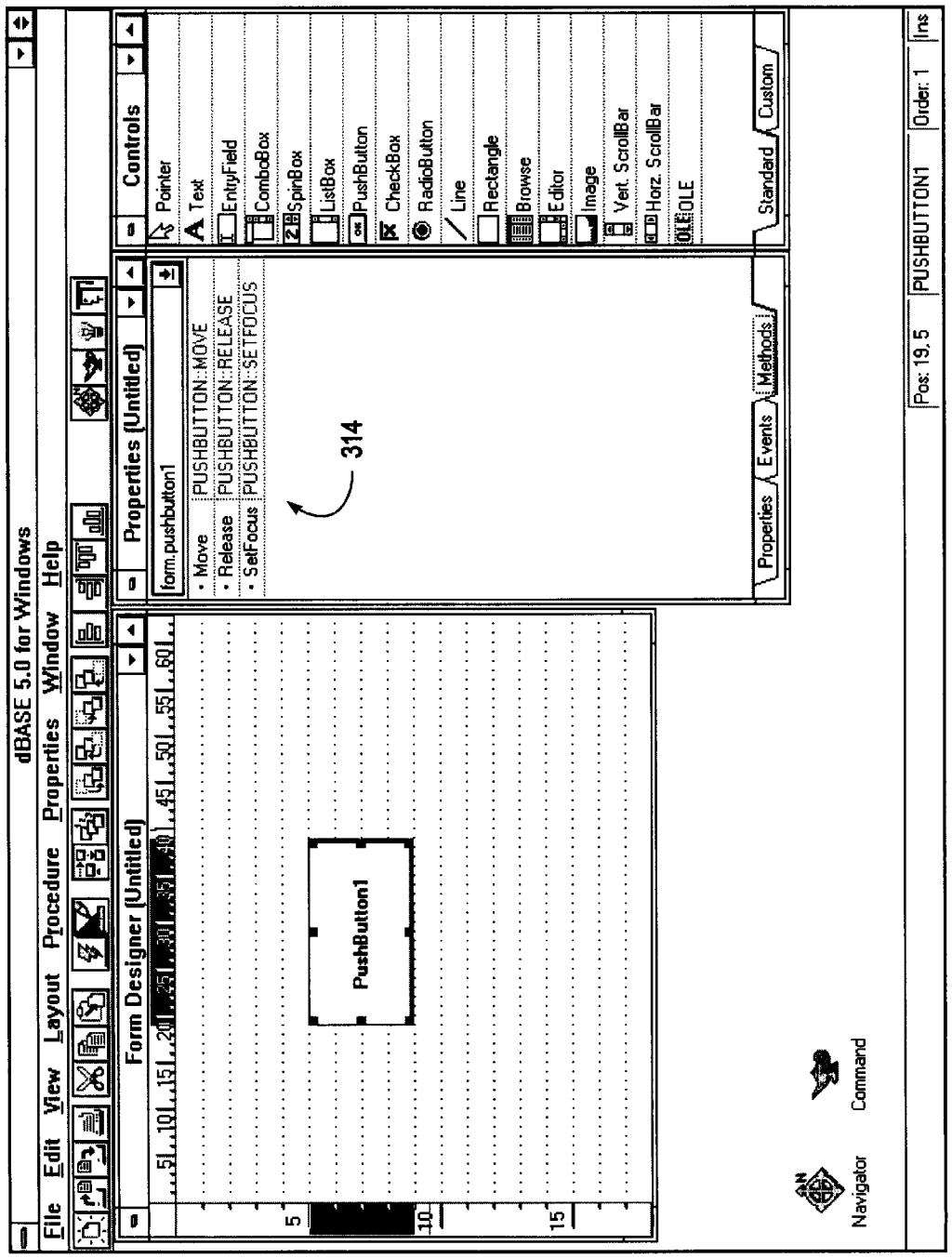

"Methods" are procedures that are associated with a particular object. They determine what actions can be performed on objects, for example, releasing objects from memory, giving focus to objects, moving objects, or the like. In FIG. 3D, the properties for the pushbutton 311, for instance, are shown in the Inspector Dialog at 314.

Figure 3E:
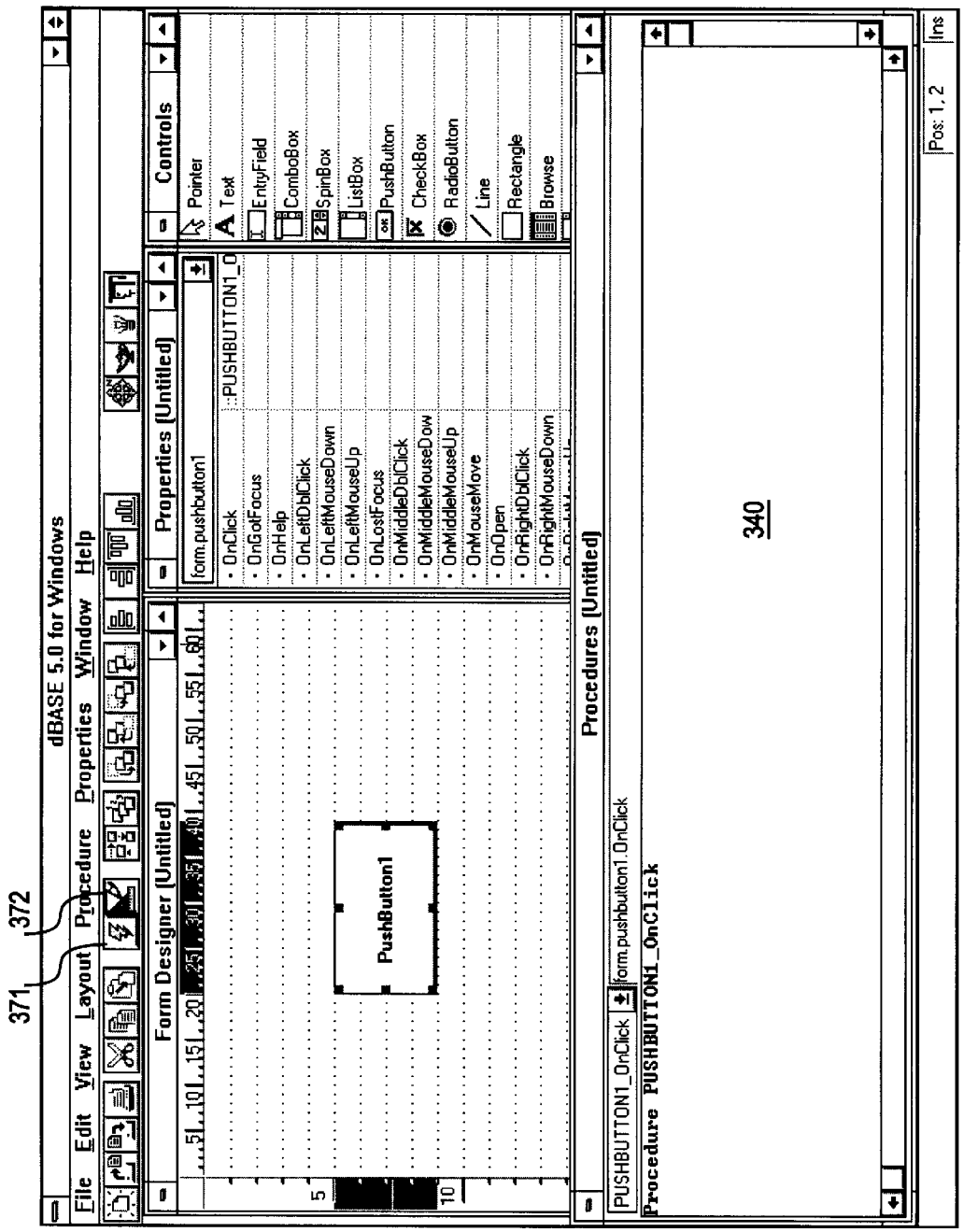

Upon invoking a Procedure Editor 340, as shown in FIG. 3E, the user writes event handlers for forms and their controls. Using the Procedure Editor and its related tools (including Link Event to Procedure and Edit Event dialog boxes), the user writes and structures the code that defines the form and its behavior. In particular, the user uses them to: (1) write methods for the form; (2) write comments at the beginning of the program; (3) write code to be executed before the form is constructed (typically, to declare static variables and public variables); (4) create event handlers by linking procedures and methods to events; and (5) write general procedures that can be referenced from other sections in the code.

If the form already has methods upon invoking the Procedure Editor, the first method in the combo box appears in the Text Editor window of the Procedure Editor. If the form does not have methods, the Procedure Editor displays comments and/or code in the header section of the form code. To open the Procedure Editor and create a new method, the user does the following. In the Object Inspector, the user clicks the Events page, chooses an event, then clicks the Tool button to the right of the text box. This process creates a new method and links it to the selected event. The Procedure Editor opens (or it becomes active if it is already open). The Text Editor window contains a PROCEDURE statement, with a suggested name for the new method. The user can write a new procedure to link to the current event in the Object Inspector. Alternatively, the user can write a new procedure, then manually link it to an event through an Link Event dialog box.

Figure 3F:
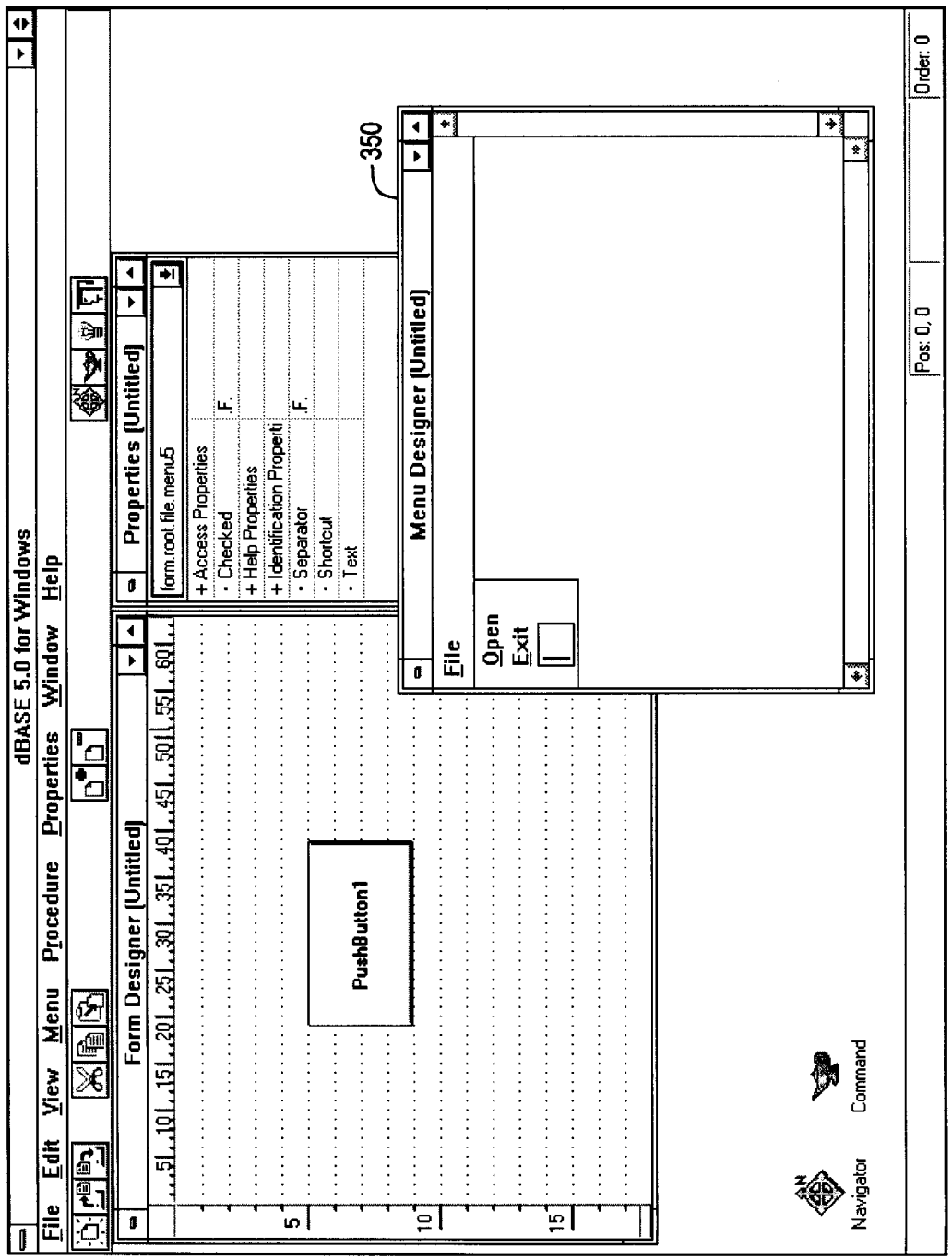

Finally, the user can user Menu Designer 350, shown in FIG. 3F, to create a complete menu system for a form, including a menu bar, pull-down menus, and cascading menus. Like the Form Designer, the Menu Designer is a tool for placing objects in a window. It uses the Object Inspector to set properties and the Procedure Editor to write event handlers. Since a menu system is made up of only one kind of object—a Menu object—there is no Control Palette for the Menu Designer. Instead, the user creates menu objects by positioning the insertion point and typing the menu prompt. The user creates a menu system by building a hierarchy of menu objects from left to right, top to bottom. To add a menu object, the user directs the insertion point to where the user wants the object to appear and then enters the menu text. In a conventional manner, the user can use the Menu Designer to add and delete Menu Items, specify "Shortcut" and "Mnemonic" keystrokes, and assign actions to Menu Objects.

Upon completion of the from, the user switches the form from "design view" to "run view"—that is, the form at runtime. When a user "runs" the form, the form and its controls become active. If the form is associated with data (e.g., records in a table), that data can be viewed and/or edited in the form by an end user. Typically, end users will operate the form using menus and other controls which were included by the designing user for controlling basic operations of the form. To run a form at any time, the user selects the screen button 371 (equivalent to menu item View|Form), shown in FIG. 3E. The user may switch back to design mode by selecting screen button 372 (equivalent to menu command View|Form Design).

Additional description of the Form Designer and its use may be found in dBASE® for Windows, *User's Guide, Programmer's Guide*, and *Language Reference*, all available from Borland International, Inc. of Scotts Valley, Calif. (Part No. DBS1150WW41000). The disclosures of each of the foregoing are hereby incorporated by reference.

B. Code Generation with Two-Way Tools

When the user instructs the system to save a form, the Designers generate source code (in a preferred embodiment, dBASE® language code) that defines the form and its objects. Specifically, the code defines the object's properties and any event-handling code which the user attached to the form and its objects. In an exemplary embodiment, the system saves the form as a text file with a default extension of .WFM (Windows ForM).

The Form Designer and the Menu Designer both generate code based on the forms and menus the user lays out visually. For most projects, the user does not need to edit the generated code. However, some projects might require the user to adapt or add to the generated code for use in the application. Since both the Form Designer and Menu Designer are "two-way tools," the user can modify the generated code with a text editor, then reload it into the Designers. This feature lets the user develop programs his or her own way, laying out objects visually, refining the code, and returning to the Designers as needed.

FIG. 4A illustrates exemplary code generated by the Form Designer. As shown in the figure, a source (.WFM) file 400 generated by the Form Designer contains three main sections. Program Header 410 comes first. In the Procedure Editor, the user can enter the program header by selecting Header from the editor's combo box (shown in FIG. 3E). The header can contain any code the user wants to execute before creating the form. Typically, the header includes comments, preprocessor directives (for declaring constants or inserting include files), and variable declarations. This is code that executes before the form is constructed at run time.

The Class Declaration 420 follows the header. Specifically, this comprises a CLASS . . . ENDCLASS definition setting forth properties and method declarations for the form. It makes up the main body of the code. The Form Designer generates most of the subclasses for the user, including the property settings for the form window and the definitions for each control. The user can enter event-handling procedures using the Procedure Editor.

The third part or general section 340 of the file comprises any code which follows the form's CLASS declaration. This section generally includes procedures that are referenced by event handlers. Declarations for "Supporting Procedures" follow the class declaration. Supporting Procedures are any procedures called by event-handling procedures. In the Procedure Editor, the user enters Supporting Procedures by selecting "General" from the Procedure Editor combo box.

FIG. 4B shows the code created by the Menu Designer. The Menu Designer saves the code to a file with a .MNU extension. The user can link a .MNU file to a form by specifying the .MNU file in the form's MenuFile property. In a manner similar to that previously described, menu source file 460 includes a Header 470 and a Class Declaration 480. Using the Menu Designer, the user can create a complete menu system for a form, including a menu bar, pulldown menus, and cascading menus. Each menu object provide built-in properties for specifying shortcut keys, checked items, grayed items, and other menu features. The user can attach code directly to menu objects through the OnClick event, making it easy to reuse all or part of a menu in another form. The model for building menus is based on the hierarchy and containership of menu objects, not the kind of menu. The user does not explicitly define menu bars, pulldown menus, or cascading menus. Instead, the user builds a hierarchy of menu objects, where each menu object contains another menu object or executes an action. Just as a form contains controls, menu objects contain other menu objects. The system automatically determines where menus appear based on their level in the hierarchy. The user's own input (e.g., "File") is used to name object references.

Internal Operation

A. Design Considerations

Ultimately, a system must store a representation of the objects being designed visually in a file, so that they may be re-designed at a later time. In Borland's Resource Workshop®, for instance, visually created objects are stored in a Microsoft Windows-compatible resource script format (i.e., .RC file). Traditionally, application design tools have stored this information in a format that is best suited for the tool. Although these tools include the capability of outputting code to a text file which can be edited, such text files are a very different form than the preferred form which these tools have traditionally stored development information. Perhaps the easiest approach to storing representations of visually-designed objects is to simply dump internal data structures of the tool to disk. Although suitable for one-way code generation, such an approach is poorly suited to bi-directional code generation.

B. Object-Centric Approach

Providing bi-directional code generation requires a whole new approach to the process of creating programs. Bi-directional code generation requires a language representation which is easily understood by the designer module (which is responsible for visual design) yet also easily understood by the language processor or compiler (which is responsible for generating the final program by compiling the source code files). According to the present invention, language representation which supports bi-directional code generation is provided in the design of the objects themselves which are employed in programs.

Figure 5:
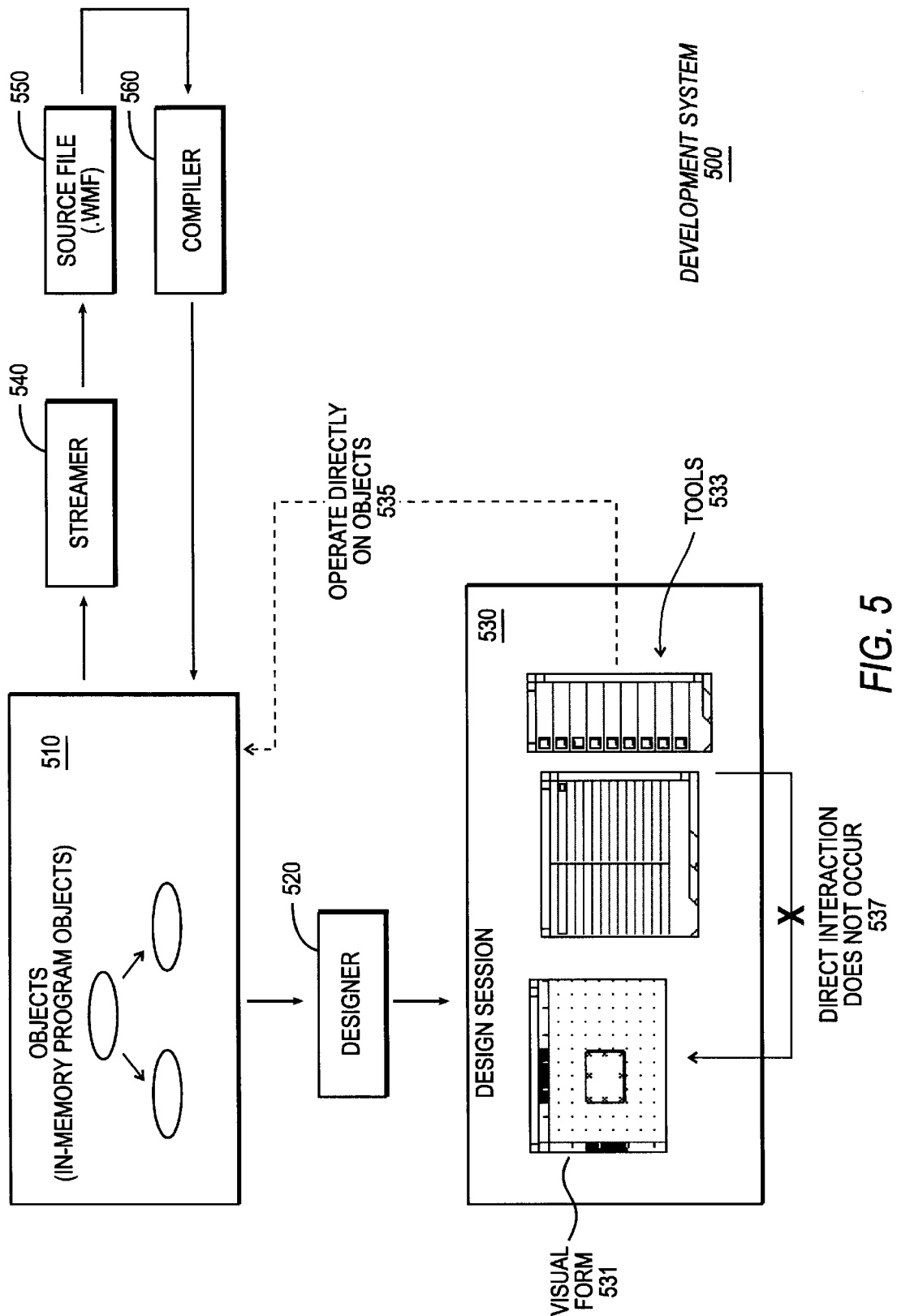
FIG. 5 is a block diagram illustrating an overview of the development system of the present invention.

FIG. 5 illustrates an overview of the approach. As shown, Development System 500 includes Objects 510. At this point, the objects may be viewed in a conventional sense in that they include data members and methods which operate on those data members; inheritance from one object class to another is also supported in a conventional manner. Of particular interest to the present invention are the visual objects—that is, objects which include an on-screen representation (e.g., pushbutton object which is displayed as a button on-screen). Although visual objects are of interest to the present invention, the Development System 500 does not treat them differently from non-visual objects. Instead, the Development System simply manages objects, some of which include the capability of being designed visually (i.e., include methods which support visual design). The approach to implementing bi-directional code generation is not to change the designer or compiler, therefore, but instead to change the basic nature of the objects themselves in the system.

Consider a form, for instance. The form consists of some collection of objects. The simplest case is just a single form object—that is, the form by itself. The form object is constructed in the system of the present invention so that it knows how to design itself—that is, it includes methods which support a user session of the form in the Form Designer. Further, the Form Object also includes methods which support streaming of the object itself to a source file (e.g., .WFM source file).

The difficulty which presents itself is, therefore, what is the "communication path" for how a user designs objects. According to the present invention, the communication path adopted is to "run" all operations through the objects themselves. To design or modify the program visually, therefore, the Objects 510 are passed to Designer 520 which, in turn, launches a Design Session 530. The Design Session 530 provides a Visual Form 531 and a plurality of Design Tools 533 for manipulating the form. The Design Session, therefore, provides a visual representation of how the form looks at run time and includes the objects that are on the form (which at this point can be modified by the user). Tools 533 comprise the tools which operate on the objects in design mode, such as the Object Inspector (Object Inspector 320 of FIG. 3A), Control Palette (Control Palette 330 of FIG. 3A), and Procedure Editor (Procedure Editor 340 of FIG. 3E). Although the Tools 533 appear to be operating on the objects of Visual Form 531, they are, in fact, instead operating directly on the Objects 510, as indicated by Dash Line 535. The effect of operating directly on the object at 510 is that modifications to the objects manifest any changes to the objects themselves at 510.

Although the Tools 533 appear to the user to be operating on the objects of Visual Form 531, this in fact is not the case. Quite simply, direct interaction between the Tools 533 and the Visual Form 531 does not occur (as indicated at 537). In other words, although the Tools 533 appear to be operating visually on objects of Visual Form 531, they are actually always operating directly on the in-memory Objects 510 (as indicated at 535). The net result is that all changes to the objects are maintained at the Objects 510. If, when designing an object, the user changes its position on screen, that action leads to a message being sent from the Tools 533 directly to the Objects 510. That message is acted upon by a corresponding message handler (i.e., an "update position" handler), which, as part of its responsibility, causes updating of the on-screen representation of that object at Visual Form 531. In this fashion, the Design Session is merely "one view" of the Objects 510.

When the user brought up the empty form 310 in FIG. 3A, and then added pushbutton object 311 in FIG. 3B, he or she is given the illusion of being able to add objects directly to the Form. What is happening instead is that the system, in response to these user inputs, is building objects in the background (i.e., in-memory Program Objects 510). The side effect of building those Objects 510 is that display methods of those objects are invoked for supporting an on-screen representation of those objects at the Design Session 530.

After the user has completed visual design of the objects, a collection of objects (i.e., Objects 510) has been created. As previously mentioned, each object includes methods which support streaming the object itself to disk. After building a collection of objects, therefore, it is a straightforward matter for the objects to stream themselves to a source file on disk. When a user saves a form during a design session, the system sends a message "stream yourself" to the Objects 510. In conjunction with Streamer 540, the objects operate to stream themselves to a Source File 550. The Source File is compiled by the Compiler 560 and then executed by the system. When the user wishes to further modify the form visually, the Source File 550 (i.e., a collection of objects which were streamed out) is executed for re-instantiating those objects. The result is that a form appears on screen. In design mode, however, after the objects begin execution, they are instructed to enter their design state.

Figure 6A:
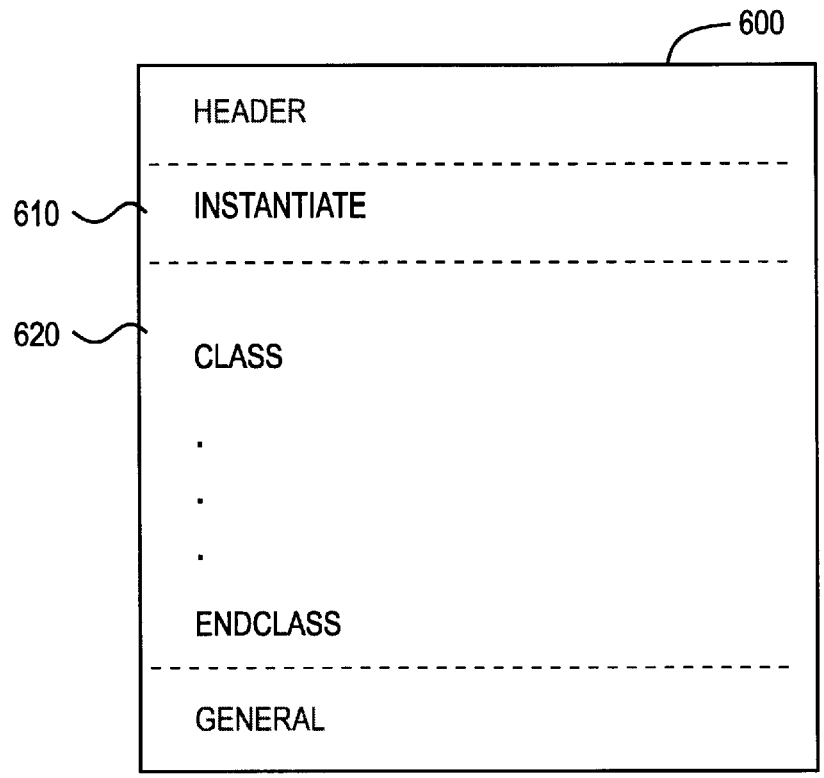
FIG. 6A is a diagram illustrating a high-level view of the source file format employed in the system of the present invention.

As illustrated in FIG. 6A, each Source File 600 includes two specific parts. The bottom part of the file, shown at 620, comprises a class definition. The class definition embodies all of the properties and behaviors associated with the form and its objects. The top part of the file, shown at 610, comprises instantiation code. This section is generally short, comprising a line for instantiating the form (FORM.NEW) and a line for opening the form (FORM.OPEN). In this manner, the Source File is a self-contained file for both running and designing the program.

Figure 6B:
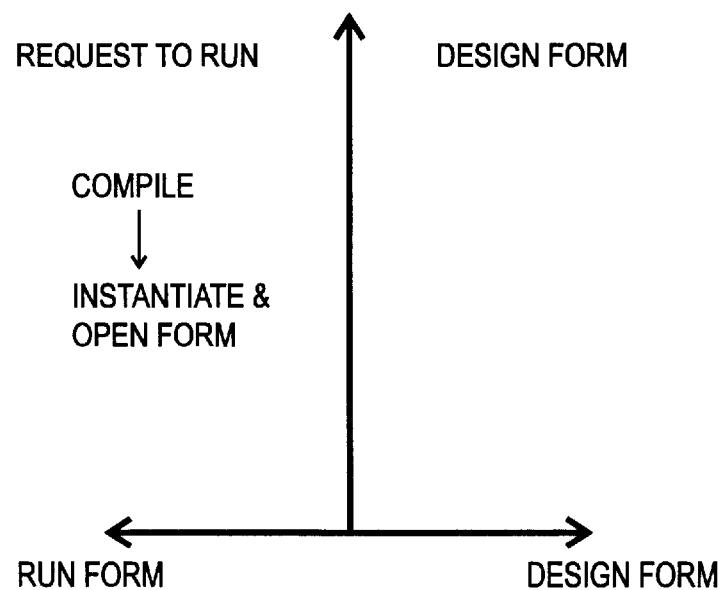
FIG. 6B is a diagram illustrating the relationship between visually designing a form, running the form, and then again visually designing the form.

FIG. 6B illustrates the general process of running the File 600. When a request is made to run a form, it is compiled and then run. Because of the Instantiation Code 610 (i.e., which says, in effect, create an instance and run it), a form is opened. If the path chosen by the user is to design a form which was previously saved, then the foregoing steps are followed, plus one additional step. That additional step is posting a message to the form and its objects to "design yourself." Internally, this instructs the form to enter into its design state.

Streaming is facilitated by the way objects are represented internally. In a preferred embodiment, object properties are represented internally as a series of name/value pairs, stored in a property table. This is implemented in a generic manner so that the system does not expect the object to be of a particular type. Specifically, objects in the system include methods for "revealing" themselves (i.e., surfacing its properties). In this manner, the Streamer object can ask objects about themselves and then write out to disk a textual representation of that information. "Streaming" in this context is the task of saving the state of an object to some representation in a file which may be recovered later. Instead of writing out the internal (in-memory) representations of data objects, therefore, the system of the present invention writes out the code which is necessary to recreate those in-memory data structures.

In addition to streaming, the ability to query objects in a generic way is also used by the design tools. The Property Inspector, for instance, interacts with objects in the exact same manner as the Streamer. When a Property Inspector lists the properties for an object, it appears to have knowledge about that object. The Object Inspector, in fact, has no knowledge about that object or any other objects, but, instead, asks the object generic questions: who are you? what are you like? what tools do you require? The approach adopted by the system of the present invention, therefore, is to employ a generic communication path whereby any module which needs to do something with an object talks to that object in a generic manner.

As an example of querying an object for determining whether it supports an interface, consider the following:

```
 1:     // Typical call to check interface support
 2:     IFileDependency *pFileDependency
 3:         = SUPPORTS(pObjSupports,IFileDependency);
 4:     // If interface is support
 5:     // invoke relevant functionality
 6:     if (pFileDependency != NULL) {
 7:            int count = pFileDependency->FileDependencyGetFileCount( );
 8:            CString fileName;
 9:            for (int i = 0; i < count; ++i) {
10:                pFileDependency->FileDependencyGetFileName(0, fileName);
11:                // printf("depend (%s)\n",fileName.GetBuffer(0));
12:            }
13:
14:     }
```

As shown at line 2, a call is made to SUPPORTS (a macro) for determining whether the object supports a particular interface, here IFileDependency. That interface knows how to get a list of dependent files. Accordingly, if the interface is supported, the dependent files are retrieved (lines 4–14). If the interface is not supported, on the other hand, no request is made to get the dependency files. The pObjSupports member is a pointer to an object which can be queried, for determining what interfaces it supports. This is in effect a pointer to a (small) portion of the current object (e.g., one being streamed). The SUPPORTS macro invokes a function call to a Supports method of the object, the call requesting its dispatch interface, a Dispatcher. The Dispatcher, in turn, knows about all the names and values of a given object—the properties and values for an object. An Enumerator is also provided which simply allows one to enumerate the properties of an object one at a time. Thus the Dispatcher has a property table; the Enumerator allows each property to be retrieved one at a time (i.e., expose properties sequentially from the Dispatcher).

In the system there exist always a Dispatcher associated with every object. The Dispatcher has the ability at any time to reconstruct in text form the name and (effective) value for properties of the object. Suppose, for instance, that the user sets the property of color to "red" for a form in the Form Designer. Internally, the Dispatcher sends a message to the Form Object to set the property color to the value of red. Although the property is set to a particular value (e.g., integer or bit pattern) corresponding to the object's internal representation of red, the object also "remembers" the text form for the property (i.e., "red"). The object completes the process by effecting any other required side effects, such as repainting a visual representation of the object on screen. Later on, when the Dispatcher asks the object about that property (via the Enumerator object), the object will respond with the textual representation of the current value for that property (i.e., "red"). Therefore, in addition to objects maintaining their own internal representations of properties (i.e., storing a particular integer for the color red), the objects also maintain textual representations of property values which can be return to the Dispatcher, upon request.

FIG. 7 illustrates a Property Table 700—the Dispatcher's view of an object (here, a pushbutton object). The Property Table or grid comprises a Name field 701, a Value field 703, a Pointer-to-Member Function field 705, and a Flags field 707. Because the Dispatcher's purpose is to dispatch the setting and getting of properties, it employs the pointer-to-member function to invoke the appropriate function for setting and getting the relevant property. Using this pointer, the Dispatcher can make a call to the appropriate member function, pass a property value, and specify whether it is getting or setting the property.

Figure 8:
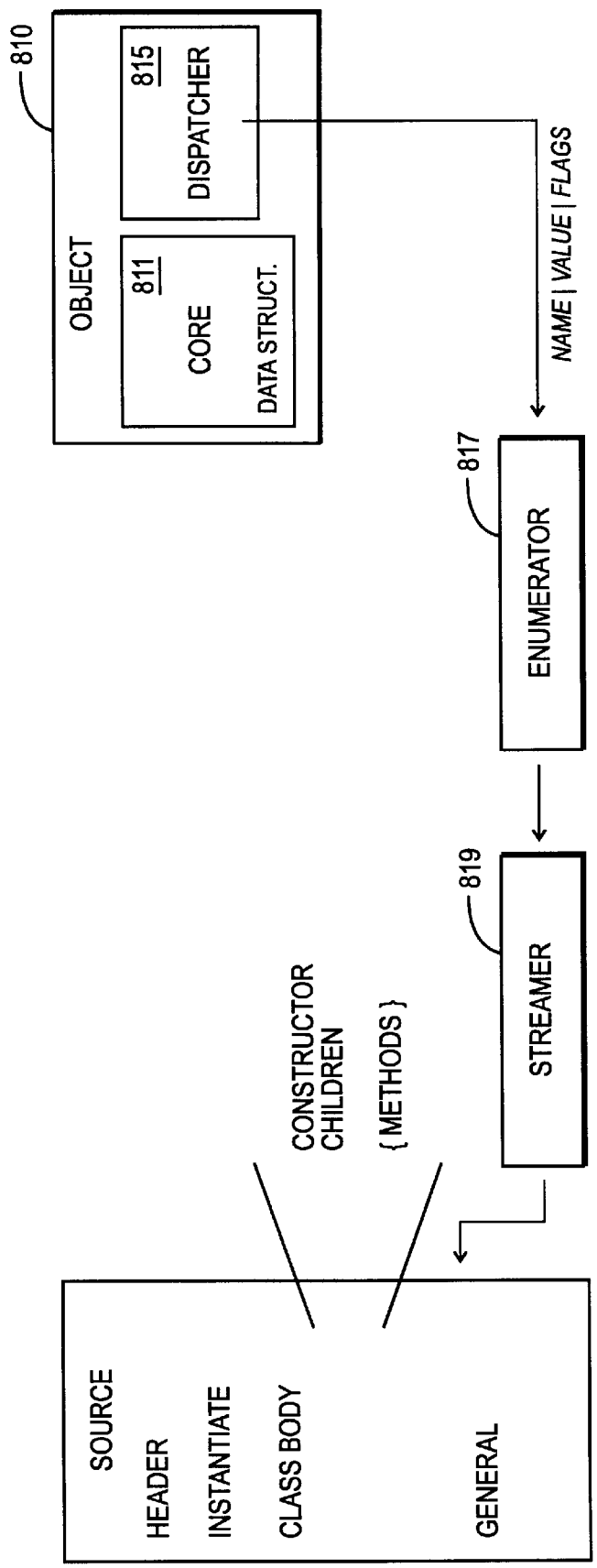
FIG. 8 is a block diagram illustrating the operation of an object streaming itself to a source file.

With an understanding of the Dispatcher and the Enumerator, the task of streaming an object will be further described. As shown in FIG. 8, Object 810, such as a pushbutton object, can be viewed as two parts: a Core 811 and a Dispatcher 815. The Core 811 comprises the core functionality needed to make the object work, such as the functionality required to make a pushbutton object work at run time. The Dispatcher 815, previously described, is responsible for getting and setting the properties of an object. At the time when it is desired to stream an object, a third object is created: Enumerator 817. The Enumerator 817 communicates with the Dispatcher 815 to enumerate all of the properties of the object. Additionally, a Streamer 819 is created. The Streamer 819 is passed a container (i.e., form) and then, in a recursive manner, streams all containees to a source file. At the level of the actual object, the streamer is enumerating the particular properties of the object.

Attached hereto is an Appendix A containing C++ source code listings, which provide further description. A suitable compiler for compiling and linking C++ code is available from Borland International. Also attached hereto is an Appendix B containing a user manuals and additional reference materials providing further description of the present invention.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

23

APPENDIX A

```
//
// $Revision:   1.12  $
// Copyright 1994 Borland International ifndef __CSTREAMO_H__
define __CSTREAMO_H__ ifndef __ISUPPORT_H__
include "isupport.h"
#endif
#ifndef __ISTREAMO_H__
#include "istreamo.h"
#endif
#ifndef __ISTREAMI_H__
#include "istreami.h"
#endif
#ifndef __IVBCTRL_H__
#include "ivbctrl.h"
#endif
#ifndef __AFXCOLL_H__
#include "afxcoll.h"
endif class CStreamObject : public ISupports, public IStreamObject
{
    private:
        CStringList m_dllList;
        CString m_baseClassName;
        ITextFileStream  *m_pStream;
        long m_refCount;
        int m_indent;
        Bool m_bAnonomous;
        Bool m_bGenerateFunctionPtrs;
        Bool m_bGenerateSetProc;
        Bool m_bGenerateHeaderComment;
        Bool m_bGenerateInstantiateObject;
        Bool m_bCustom;
        CMapPtrToWord m_procNames;

public:
        CStreamObject::CStreamObject();
        CStreamObject::~CStreamObject();

// accessors
    protected:
        CMapPtrToWord &GetProcNames()           { return(m_procNames); }
        CStringList &GetDLLList(void)           { return(m_dllList); }
```

24

```
        void SetStream(ITextFileStream *pStream)  { m_pStream = pStream; }
        ITextFileStream *GetStream(void)           { return(m_pStream); }
        long IncrementRefCount()                   { return(++m_refCount); }
        long DecrementRefCount()                   { return(--m_refCount); }
        long GetRefCount()                         { return(m_refCount); }
        void SetRefCount(long count)               { m_refCount = count; }
        int  GetIndent(void)                       { return(m_indent); }
        void SetIndent(int amount)                 { m_indent = amount; }
        void SetAnonomous(Bool bVal)               { m_bAnonomous = bVal; }
        Bool GetAnonomous(void)                    { return(m_bAnonomous); }
        void SetCustom(Bool bVal)                  { m_bCustom = bVal; }
        Bool GetCustom(void)                       { return(m_bCustom); }
        void SetGenerateSetProc(Bool bVal)         { m_bGenerateSetProc = bVal;
}
        Bool GetGenerateSetProc(void)              {
return(m_bGenerateSetProc); }
        void SetGenerateFunctionPtrs(Bool bVal)    { m_bGenerateFunctionPtrs =
bVal; }
        Bool GetGenerateFunctionPtrs(void)         {
return(m_bGenerateFunctionPtrs); }
        void SetGenerateHeaderComment(Bool bVal)   { m_bGenerateHeaderComment =
bVal; }
        Bool GetGenerateHeaderComment(void)        {
return(m_bGenerateHeaderComment); }
        void SetGenerateInstantiateObject(Bool bVal) {
m_bGenerateInstantiateObject = bVal; }
        Bool GetGenerateInstantiateObject(void)    {
return(m_bGenerateInstantiateObject); }
        void   SetBaseClassName(String pName)      { m_baseClassName = pName; }
        void   SetBaseClassName(CString pName)     { m_baseClassName = pName; }
        CString &GetBaseClassName(void)            { return(m_baseClassName); }

// Utilities
    protected:
        void CollectProcedureFiles(ISupports *pChildSupports);

void FormatDbCode(CString &lineBuf, String pName, VarRefType var,
                CString indentBuf, Bool bAssign);
        void FormatPrintCString(CString &buf, VarRefType pVar);
        void StreamCurrentObject(ISupports *pObjSupports,  String className,
                int indent, String parentName);
        void FormatStreamableCharacter(CString &value, CString &buf);

void GenerateInstantiateObject(ISupports *pSupports, String
pClassName,
                String pBaseClassName);
        void GenerateLoadVBX(IVBControl *pVBCtrl, CString &indentBuf);
        void GenerateSetProcedure(CString &indentBuf);

void CreateBlankString(CString &buf,int length);
```

25

```
        // Interface
        public:
            void StreamObjectSaveAsCustom(String className, String
        fileName,ISupports* pSupports, CWnd *parent, BOOL bObjectProceeduresOnly,
        BOOL bSafety);
            void StreamObjectStreamInstance(ITextFileStream *pStream, ISupports
        *pObjSupports,  String className, String parentName);
            void StreamObjectStreamClass(ITextFileStream *pStream, ISupports
        *pObjSupports,  String className);
            void StreamObjectStreamObject(ITextFileStream *pStream, ISupports
        *pObjSupports,  String className, String parentName);
            void StreamObjectStream(ITextFileStream *pStream, ISupports
        *pObjSupports,  String className);
            void StreamObjectSetIndent(int amount);
            void StreamObjectSetAnonomous(Bool bVal);
            void StreamObjectSetCustom(Bool bVal);
            void StreamObjectSetGenerateHeaderComment(Bool bVal);
            void StreamObjectSetGenerateSetProc(Bool bVal);
            void StreamObjectSetGenerateFunctionPtrs(Bool bVal);
            void StreamObjectSetGenerateInstantiateObject(Bool bVal);
            void StreamObjectSetBaseClass(String pName);
            void StreamObjectDestroy();

void * Supports(EInterfaceId id);
            uint32 SupportsAddRef();
            uint32 SupportsRelease();
        };
        #endif
```

```
// $Revision:   1.66  $ ifndef __FLAT__
    #pragma option -dc
endif pragma hdrfile "\ashley\obj\cpp\at\at.pch"
include "atpch.ext"
pragma hdrstop include <afxcoll.h>
include <assert.h>
include <search.h> include "newtypes.h"
include "variable.ext"
#include "cstream.h"
#include "iproc.h"
#include "iid.h"
#include "ibdisp.h"
#include "ienumprp.h"
#include "ictrlprp.h"
#include "bdisp.h"
#include "stringid.def"
#include "classmgr.h"
#include "imemory.h"
#include "panelw.fn"
#include "ivbctrl.h"
#include "cstreamo.h"
#include "cstreamo.def"
#include "miscw.fn"
#include "iqueryst.h"
#include "ifiledep.h"
#include "iprocmgr.h"

#include "keywords.ext"
#include "tokens.h"
#include "runtime.ext"
#include "error.ext"
#include "msg.ext"

void CStreamObject::FormatStreamableCharacter(CString &value, CString &buf)
//--------------------------------------------------------------------------
//
// FormatStreamableCharacter
//
// Passed:
//     CString &value    String value to be formatted (e.g. abc -> "abc")
//     CString &buf      Buffer to hold resulting formatted string
//
```

```
        // Description:
        //     Formats a character string value suitable for streaming.  In the
        //     simple case, the string is merely enclosed in quotes.  If the string
        //     (in value) contains one or more Double quote characters ("), then
5  each
        //     occurance of (") is replaced by (+ '"' +).
        //
        // Returns:
        //
10      // Notes:
        //
        // Side Effects:
        //
        // Written By:
15      //
        //----------------------------------------------------------------------
        ----
        {
            char msgPlus[] = TEXT(" + ");
20          Bool bSingle = FALSE;

int pos = value.Find('"');

if (pos != -1) {
25              if (value.Find('\'') == -1) {
                    buf = msgSingleQuote;
                    buf += value;
                    buf += msgSingleQuote;
                    bSingle = TRUE;
30              }
            } if (!bSingle) {
                if (pos != -1) {
35                  CString tempBuf;
                    Bool bEmpty = TRUE;
                    while (pos != -1) {
                        if (pos > 0) {
                            bEmpty = FALSE;
40                          tempBuf += msgDoubleQuote;
                            tempBuf += value.Left(pos);
                            tempBuf += msgDoubleQuote;
                        }
                        if (!bEmpty) {
45                          tempBuf += msgPlus;
                        }
                        else {
                            bEmpty = FALSE;
                        }
50
                        tempBuf += msgSingleQuote;
```

```
                    while (value[pos] == '"') {
                       tempBuf += msgDoubleQuote;
                       ++pos;
                    }
                    tempBuf += msgSingleQuote;

if (pos >= value.GetLength()) {
                       value.Empty();
                    }
                    else {
                       value = value.Mid(pos);
                    }
                    pos = value.Find('"');
                    if (pos != -1) {
                       tempBuf += msgPlus;
                    }
                 }
                 buf = tempBuf;
                 if (!value.IsEmpty()) {
                    buf += msgPlus;
                    buf += msgDoubleQuote;
                    buf += value;
                    buf += msgDoubleQuote;
                 }
              }
              else {
                 buf = msgDoubleQuote;
                 buf += value;
                 buf += msgDoubleQuote;
              }
           } value = buf;

// replace all occurances of "&&" with "+ '&' + '&' +"
           pos = value.Find("&&");
           if (pos != -1) {
              CString tempBuf;
              Bool bEmpty = TRUE;
              while (pos != -1) {
                 if (pos > 1) {
                    bEmpty = FALSE;
                    tempBuf += value.Left(pos);
                    tempBuf += msgDoubleQuote;
                 }
                 if (!bEmpty) {
                    tempBuf += msgPlus;
                 }
                 else {
                    bEmpty = FALSE;
```

```
                    } tempBuf += msgSingleQuote;
                    while (value[pos] == '&') {
                       tempBuf += value[pos];
                       ++pos;
                       if (value[pos] == '&') {
                          tempBuf += TEXT("' + '");
                       }
                    } tempBuf += msgSingleQuote;

if (pos >= value.GetLength()) {
                       value.Empty();
                    }
                    else {
                       value = value.Mid(pos);
                    }
                    pos = value.Find("&&");
                    if (pos != -1) {
                       tempBuf += msgPlus;
                    }
                 }
                 buf = tempBuf;
                 if (!value.IsEmpty()) {
                    buf += msgPlus;
                    buf += msgDoubleQuote;
                    buf += value;
                 }
              }

}
    void CStreamObject::FormatPrintCString(CString &buf, VarRefType pVar)
    //---------------------------------------------------------------------------
    //
    // FormatPrintCString
    //
    // Passed:
    //     CString &buf        Buffer to hold resulting formatted string
    //     VarRefType pVar     Variable to be formatted
    //
    // Description:
    //     Produces a printable string form of a variable suitable for
    streaming.
    //     The result will always be a valid R-Value in string form.
    //
    // Returns:
    //
```

```
// Notes:
//
// Side Effects:
//
// Written By:
//
//------------------------------------------------------------------------
    ----
{
    if (pVar->IsFunctionPtr()) {
        CString name = SYM_TABLE_PNAME(VAR_FUNCTION_SYMINDEX(pVar));
        int pos = name.Find(msgColonColon);
        if (pos != -1) {
            // if classname same as ours...
            buf = TEXT("CLASS::");
            buf += name.Mid(pos+2);
        }
        else {
            buf = name;
        }
    }
    else if (pVar->IsCharacter()) {
        CString tempBuf;
        ::FormatPrintCString(tempBuf, pVar);
        FormatStreamableCharacter(tempBuf, buf);
    }
    else if (pVar->IsDate()) {
        CString tempBuf;
        ::FormatPrintCString(tempBuf, pVar);
        buf = TEXT("{");
        buf += tempBuf;
        buf += TEXT("}");
    }
    else if( pVar->IsNumeric()) {
        tchar savePoint = SET_POINT_TO;
        int saveDecimals = SET_DECIMALS_TO;
        SET_POINT_TO = '.';
        SET_DECIMALS_TO = 4;
        ::FormatPrintCString(buf, pVar);
        SET_POINT_TO = savePoint;
        SET_DECIMALS_TO = saveDecimals;

// Scan backwards from the end of the string.  Remove any trailing
0's
        //   that appear before the decimal point.
        BOOL bDecp = FALSE;
        tchar *pBuf = buf.GetBuffer(0);
        int i = tstrlen(pBuf);
        while( i-- && !bDecp ){
            if( pBuf[i] == TEXT('.') ){
                bDecp = TRUE;
```

```
            }
            else if( pBuf[i] < TEXT('0') || pBuf[i] > TEXT('9') ){
                break;
            }
        } if( bDecp ){
            i = buf.GetLength();
            while( buf[i-1] == TEXT('0') ){
                i--;
            }
            if( buf[i-1] == TEXT('.') ){
                i--;
            } if( i != buf.GetLength() ){
                buf = buf.Left(i);
            }
        }
        buf = SkipLeadingBlanks(buf.GetBuffer(1));
    }
    else {
        ::FormatPrintCString(buf, pVar);
    }
} void CStreamObject::FormatDbCode(CString &lineBuf, String pName, VarRefType var,
                CString indentBuf, Bool bAssign)
{
//--------------------------------------------------------------------------------
//
// FormatDbCode
//
// Passed:
//     CString &lineBuf   Buffer to hold resulting dBASE statement
//     String pName       Name of property being assigned to.
//     VarRefType var     Variable value that is to be assigned to pName
//     indentBuf          A 0 terminated string of space characters to
//                        procede resulting dBASE statement
//     bAssign            TRUE when generated code is to be of the form:
//                            "this.property = value"
//                        FALSE when generated code is to be of the form:
//                            "property value" (part of a DEFINE statement)
//
// Description:
//     Produces either an assignment statement or part of a DEFINE
//     statement sutiable for streaming.
//
```

```
// Returns:
//
// Notes:
//
// Side Effects:
//
// Written By:
//
//---------------------------------------------------------------------------
----

CString value;

FormatPrintCString(value, var);

if (bAssign) {
        lineBuf = indentBuf;
        lineBuf += TEXT("this.");
        lineBuf += pName;
        lineBuf += TEXT(" = ");
        lineBuf += value;
    }
    else {
        lineBuf = indentBuf;
        lineBuf += pName;
        lineBuf += msgBlank;
        lineBuf += value;
    }

} void StreamObject(ISupports *pSupports, ITextFileStream *pStream,
    String pName, int /*indent*/, String /*parentName*/)

{
//---------------------------------------------------------------------------
----
//
// StreamObject
//
// Passed:
//     ISupports *pSupports      Root object of object tree to be streamed
//     ITextFileStream pStream   Stream to which generated code will be written.
//     String pName              Class name of newly generated class
//     int indent                (obsolete)
//     String parentName         (obsolete)
//
//
// Description:
//     Streams an object by generating a CLASS definition and optionally
```

```
//      generating instance code.
//
// Returns:
//
// Notes:
//
// Side Effects:
//
// Written By:
//
//----------------------------------------------------------------------
----
    ISupports *pStreamSupports = MakeStreamObject();
    IStreamObject *pStreamObject = SUPPORTS(pStreamSupports, IStreamObject);

pStreamObject->StreamObjectStream(pStream, pSupports, pName);
    pStreamObject->StreamObjectDestroy();

}

ISupports *MakeStreamObject()
{
    CStreamObject *pStreamObject = new CStreamObject();

return(pStreamObject);

}

CStreamObject::CStreamObject() :
    m_refCount(1L),
    m_bAnonomous(FALSE),
    m_bGenerateFunctionPtrs(TRUE),
    m_bCustom(FALSE),
    m_bGenerateSetProc(TRUE),
    m_bGenerateHeaderComment(TRUE),
    m_bGenerateInstantiateObject(TRUE),
    m_indent(DEFAULT_INDENT_AMOUNT)
{
} void CStreamObject::StreamObjectDestroy()
{
    delete this;
}

CStreamObject::~CStreamObject()
{
} void * CStreamObject::Supports(EInterfaceId id)
{
```

34

```
        switch (id) {
            SUPPORT_IMPLEMENTS(IStreamObject)
        }
        return(NULL);
    }
    uint32 CStreamObject::SupportsAddRef()
    {
        return(IncrementRefCount());
    } uint32 CStreamObject::SupportsRelease()
    {
        uint32 l = DecrementRefCount();

if (GetRefCount() == 0){
            delete this;
        }
        return(1);
    } void CStreamObject::StreamObjectSaveAsCustom(String className, String
    fileName,
        ISupports* pSupports, CWnd *parent, BOOL bObjectProceeduresOnly, BOOL
    bSafety)
    {
        CTextFileStream fileStream;

Bool bOK = TRUE;

Bool bExists = GetIProcedure()->ProcedureClassExists(fileName,
    className);

if (bExists) {
            if (bSafety) {
                tchar writeBuf[100];

sprintf(writeBuf,theApp.MsgLoadTmpString(IDS_CUSTOM_CLASS_EXISTS_MESSAGE),
                className);
                if
    (PanGetYesNo(theApp.MsgLoadTmpString(IDS_CUSTOM_CLASS_EXISTS_CAPTION),
                    writeBuf, NULL, FALSE, parent)
                    == PAN_YES_OFFSET) {
                    GetIProcedure()->ProcedureRemoveClass(fileName, className);
                }
                else {
                    bOK = FALSE;
                }
            }
            else {
```

35

```
            GetIProcedure()->ProcedureRemoveClass(fileName, className);
        }
      }
      if (bOK) {
        CFileException fileException;
        UINT openFlag;

if (FileExist(fileName)) {
          bOK = fileStream.StreamOpen(fileName,
                       (openFlag = CFile::modeReadWrite | CFile::typeBinary),
                       &fileException);

if (bOK) {
            fileStream.StreamSeekToEnd();
            if (!bExists) {
              fileStream.StreamWriteTextLineNL(msgNoMessage);
            }
          }
        }
        else {
          bOK = fileStream.StreamOpen(fileName,
                       (openFlag = CFile::modeCreate | CFile::modeReadWrite),
                       &fileException);
        } if (bOK) {
          StreamObjectSetAnonomous(FALSE);
          StreamObjectSetCustom(TRUE);
          StreamObjectSetGenerateFunctionPtrs(TRUE);
          StreamObjectSetGenerateSetProc(FALSE);
          StreamObjectSetGenerateHeaderComment(FALSE);
          StreamObjectSetGenerateInstantiateObject(FALSE);

SetStream(&fileStream);
          StreamCurrentObject(pSupports, className, INITIAL_INDENT,
INITIAL_PARENT);

ISupports* pFormSupports = parent->GetBDispatch(TRUE);
          IProcedureDesign *pProcDesign = SUPPORTS(pFormSupports,
IProcedureDesign);
          if (pProcDesign != NULL) {
            if (bObjectProceeduresOnly) {
              IBDispatch *pDispatch = SUPPORTS(pSupports,IBDispatch);
              ISupports *pEnumSupports =
BDispatchCreateEnumerator(pDispatch);
              IEnumProps *pEnum = SUPPORTS(pEnumSupports, IEnumProps);
              pEnum->TableGoTop();

VarType var;
              var.Init();
```

36

```
                while (!pEnum->TableEOT()) {
                    if ( pEnum->EnumQueryStream() ) {
                       var.Clear();
                       pEnum->EnumGetValue(&var);
                       if (var.IsFunctionPtr()) {
                          CString name =
      SYM_TABLE_PNAME(VAR_FUNCTION_SYMINDEX(&var));
                          int pos = name.Find(msgColonColon);
                          if (pos >=0) {
                              pProcDesign->WriteSingleProcedure(&fileStream,
                                 name.GetBuffer(1) + pos + 2);
                          }
                       }
                    }
                    pEnum->TableSkip(1);
                }
                fileStream.StreamWriteTextLineNL(TEXT("ENDCLASS"));

pEnumSupports->SupportsRelease();
             }
             else {
                pProcDesign->WriteProcedures(&fileStream, FALSE);
             }
          }
          else {
             fileStream.StreamWriteTextLineNL(TEXT("ENDCLASS"));
          } fileStream.StreamClose();
       }
       else {
          SupportsRelease();
          Error( TranslateFileError(fileException.m_cause,openFlag),
      fileName);
       }
    }
} void CStreamObject::StreamObjectSetBaseClass(String name)
{
    SetBaseClassName(name);
} void CStreamObject::StreamObjectSetIndent(int amount)
{
    SetIndent(amount);
} void CStreamObject::StreamObjectStream(ITextFileStream *pStream,
    ISupports *pObjSupports,  String className)
{
```

37

```
    SetStream(pStream);
    StreamCurrentObject(pObjSupports, className, INITIAL_INDENT,
INITIAL_PARENT);

} void CStreamObject::StreamObjectStreamClass(ITextFileStream *pStream,
    ISupports *pObjSupports,  String className)
{
    SetStream(pStream);
    StreamCurrentObject(pObjSupports, className, INITIAL_INDENT,
INITIAL_PARENT);
    pStream->StreamWriteTextLineNL(TEXT("ENDCLASS"));

} void CStreamObject::StreamObjectSetCustom(Bool bVal)
{
    SetCustom(bVal);
} void CStreamObject::StreamObjectSetGenerateSetProc(Bool bVal)
{
    SetGenerateSetProc(bVal);
} void CStreamObject::StreamObjectSetAnonomous(Bool bVal)
{
    SetAnonomous(bVal);
} void CStreamObject::StreamObjectSetGenerateFunctionPtrs(Bool bVal)
{
    SetGenerateFunctionPtrs(bVal);
} void CStreamObject::StreamObjectSetGenerateHeaderComment(Bool bVal)
{
    SetGenerateHeaderComment(bVal);
} void CStreamObject::StreamObjectSetGenerateInstantiateObject(Bool bVal)
{
    SetGenerateInstantiateObject(bVal);
} void CStreamObject::StreamObjectStreamInstance(ITextFileStream *pStream,
    ISupports *pObjSupports,  String className, String parentName)
    {
```

38

```
        SetStream(pStream);
        StreamCurrentObject(pObjSupports, className, INITIAL_INDENT,
    parentName);

} void CStreamObject::CreateBlankString(CString &buf,int length)
    {
        String pActualBuf = buf.GetBufferSetLength(length + 1);

// Violate CString a bit...
        memset(pActualBuf,TEXT(' '),length);
        pActualBuf[length] = TEXT('\0');

buf.ReleaseBuffer();

} void CStreamObject::CollectProcedureFiles(ISupports *pChildSupports)
    {
    //--------------------------------------------------------------------------
    //
    // CollectProcedureFiles
    //
    // Passed:
    //     ISupports pChildSupports
    //
    // Description:
    //     Sucessively builds a list of procedure file dependencies by
    //     examining the constructor associated with pChildSupports
    //     and determining is procedure file location.
    //
    // Returns:
    //     nothing
    //
    // Notes:
    // Side Effects:
    //
    // Written By:
    //
    //--------------------------------------------------------------------------
        IBDispatch *pDispatch = SUPPORTS(pChildSupports,IBDispatch);
        ISupports *pEnumSupports = BDispatchCreateEnumerator(pDispatch);
        IEnumProps *pEnum = SUPPORTS(pEnumSupports, IEnumProps);

String pName = pEnum->EnumGetClassName();
        CString constructorName = pName;
        constructorName += msgColonColon;
```

39

```
        constructorName += pName;
        SymIndexType symId = SymIntern(
            constructorName.GetBuffer(1), constructorName.GetLength());

5       UdfRefType pFunction = SYM_TABLE_FUNC(symId);

if ( (pFunction != NULL) && ((IS_PROCEDURE_SYMBOL(pFunction)) ||
            (IS_UDF_SYMBOL(pFunction))) ) {

10          String procName = UDF_SOURCE_NAME(pFunction);
            WORD value;

if (!GetProcNames().Lookup(procName, value)) {
                GetProcNames().SetAt(procName, 0);
15          }
        }

}

20
    void CStreamObject::GenerateSetProcedure(CString &indentBuf)
    {
        ITextFileStream  *pStream = GetStream();
25
        for (POSITION pos = GetProcNames().GetStartPosition(); pos != NULL;) {
            void *procName;
            WORD value;
            GetProcNames().GetNextAssoc(pos, procName, value);
30          CFileName buf = (String) procName;

String relativeFileName = buf.FindRelativeFilename();

tchar cmd[FULL_FILENAME_SIZE + 32];
35          twsprintf(cmd,
                CheckGenerateWithQuotes(relativeFileName,
                    msgFormatStrings4,
                    msgFormatStrings4WithQuotes3),
                indentBuf.GetBuffer(1) + 1,
40              TEXT("Set Procedure To"),
                relativeFileName,
                "additive");
            pStream->StreamWriteTextLineNL(cmd);
        }
45
    } void CStreamObject::GenerateLoadVBX(IVBControl *pVBCtrl, CString
50  &indentBuf)
    {
```

40

```
        ITextFileStream   *pStream = GetStream();

CString name = pVBCtrl->GetDllName();
        POSITION pos = GetDLLList().Find(name);
 5      if (pos == NULL) {

GetDLLList().AddTail(name);

tchar cmd[FULL_FILENAME_SIZE+32];
10          twsprintf(cmd,
                      CheckGenerateWithQuotes(name.GetBuffer(1),
                                              msgFormatStrings3,
                                              msgFormatStrings3WithQuotes3),
                      indentBuf.GetBuffer(1),
15                    TEXT("load dll"),
                      name.GetBuffer(1));

pStream->StreamWriteTextLineNL(cmd);
        }
20  } void CStreamObject::GenerateInstantiateObject(ISupports *pSupports,
         String pClassName, String pBaseClassName)
25  {
        CString lineBuf;
        ITextFileStream  *pStream = GetStream();

IStreamInstancePtr pStreamInstance =
30      SUPPORTS(pSupports,IStreamInstance);

String parameterString ;
        if (pStreamInstance == NULL) {
            parameterString = NULL;
35      }
        else {
            parameterString =
    pStreamInstance->StreamInstanceGetParameterListString();
            // begin generate code to instantiate form or top level container
40          if (GetGenerateInstantiateObject()) {
                int lineCount = pStreamInstance->StreamInstanceGetLineCount();
                for (int i = 0; i < lineCount; ++i) {
                    pStreamInstance->StreamInstanceGetLine(lineBuf, i, pClassName);
                    pStream->StreamWriteTextLineNL(lineBuf.GetBuffer(1));
45              }
            }

}

50      // Generate Class Statement
        lineBuf = TEXT("CLASS ");
```

41

```
            lineBuf += pClassName;
            if (parameterString != NULL) {
               lineBuf += msgLeftParent;
               lineBuf += parameterString;
  5            lineBuf += msgRightParent;
            }
            lineBuf += TEXT(" OF ");
            lineBuf += pBaseClassName;
            if (parameterString != NULL) {
 10            lineBuf += msgLeftParent;
               lineBuf += parameterString;
               lineBuf += msgRightParent;
            }
            if (GetCustom()) {
 15            lineBuf += TEXT(" Custom");
            }
            IBDispatch *pDispatch = SUPPORTS(pSupports,IBDispatch);
            const tchar *procName = pDispatch->DispatchGetProcedureName();
            if (procName != NULL) {
 20            lineBuf += TEXT(" From ");
               lineBuf += msgDoubleQuote;
               CFileName relativeName = (String) procName;
               lineBuf += relativeName.FindRelativeFilename();
               lineBuf += msgDoubleQuote;
 25         }

// write out CLASS statement
            pStream->StreamWriteTextLineNL(lineBuf.GetBuffer(1));

30      } void CStreamObject::StreamCurrentObject(ISupports *pObjSupports, String
         pClassName,
            int indent, String parentName)
 35      {
            CString lineBuf;
            CString defineLineBuf;
            CString propertyLineBuf;
            Bool bPrior = FALSE;
 40         Bool bContainer = (parentName == NULL);
            ITextFileStream  *pStream = GetStream();
            ISupports *pEnumSupports = NULL;

IBDispatch *pDispatch = SUPPORTS(pObjSupports,IBDispatch);
 45
            if (pDispatch != NULL) {
               pEnumSupports = BDispatchCreateEnumerator(pDispatch);
               IEnumProps *pEnum = SUPPORTS(pEnumSupports, IEnumProps);

50            VarType var;
               var.Init();
```

42

```
            tchar nameBuf[64];
            SymIndexType symId;
            SymIndexType superSymId;
            CString indentBuf;
 5
            CreateBlankString(indentBuf,indent);

CString ofName = (parentName == NULL) ? TEXT("THIS") : parentName;

10          if (bContainer) {
                if (GetGenerateHeaderComment()) {
                    pStream->StreamWriteTextLineNL(msgAsterisk);
                    tchar dateBuf[11];
                    lineBuf.LoadString(IDS_STREAM_GENERATED_ON);
15                  lineBuf += GetCurrentDate(dateBuf);
                    pStream->StreamWriteTextLineNL(lineBuf.GetBuffer(1));
                    pStream->StreamWriteTextLineNL(msgAsterisk);
                }

20              symId = pEnum->EnumGetClassNameSymId();
                superSymId = ClassManagerFindSuper(symId);
                String pBaseClassName;
                if (GetBaseClassName().IsEmpty()) {
                    pBaseClassName = SYM_TABLE_PNAME(superSymId == SYMBOL_NO_ENTRY
25      ?
                        symId : superSymId);
                }
                else {
                    pBaseClassName = GetBaseClassName().GetBuffer(1);
30              }

GenerateInstantiateObject(pObjSupports,pClassName,
        pBaseClassName);

35          }
            else {
                pStream->StreamWriteTextLineNL(msgNoMessage);
                IVBControl *pVBCtrl = SUPPORTS(pObjSupports,IVBControl);
                if (pVBCtrl != NULL) {
40                  GenerateLoadVBX(pVBCtrl, indentBuf);
                }
                if (GetAnonomous()) {
                    symId = pEnum->EnumGetClassNameSymId();
                    superSymId = ClassManagerFindSuper(symId);
45                  pClassName =
                        SYM_TABLE_PNAME(superSymId == SYMBOL_NO_ENTRY ? symId :
        superSymId);

}
50              defineLineBuf = indentBuf + TEXT("DEFINE ") +
        pEnum->EnumGetClassName() +
```

43

```
            msgBlank + pClassName + TEXT(" OF ") + ofName;

ofName += TEXT(".");
            ofName += pClassName;
 5
            //pStream->StreamWriteTextLineNL(defineLineBuf.GetBuffer(1));

indent += GetIndent();

10          CreateBlankString(indentBuf,indent);
            propertyLineBuf = indentBuf + TEXT(" PROPERTY; ");
            //pStream->StreamWriteTextLineNL(propertyLineBuf.GetBuffer(1));
         }
         IFileDependency *pFileDependency =
15      SUPPORTS(pObjSupports,IFileDependency);

if (pFileDependency != NULL) {
            int count = pFileDependency->FileDependencyGetFileCount();
            CString fileName;
20          for (int i = 0; i < count; ++i) {
               pFileDependency->FileDependencyGetFileName(0, fileName);
              // printf("depend (%s)\n",fileName.GetBuffer(0));
            }

25       } indent += GetIndent();
         CreateBlankString(indentBuf,indent);
30
         EPROP_FLAGS flags;
         BYTE *bookMark;

int nChild = 0;
35       int bookMarkSize = 0;
         int keySize = 0;
         tchar *keyType;
         pfKeyCompare pfCompare;

40       // accumulate children to controls so they may be sorted by z-order
         pEnum->TableGoTop();
         while (!pEnum->TableEOT()) {
            if ( pEnum->EnumQueryChild() && pEnum->EnumQueryStream() ) {
            //if ( pEnum->EnumQueryChild() ) {
45             var.Clear();
               pEnum->EnumGetValue(&var);

Bool bOK = TRUE;

50             IQueryStream *pQueryStream = SUPPORTS(var.GetObjectRef(),
        IQueryStream);
```

44

```
            if (pQueryStream != NULL) {
               bOK = pQueryStream->QueryStreamStreamAsChild();
            }
            if (bOK) {
 5             if (bookMarkSize == 0) {

IKey *pKey = SUPPORTS(var.GetObjectRef(),IKey);
                  assert(pKey);
                  keySize = pKey->KeyGetLength();
10                keyType = pKey->KeyGetType();
                  pfCompare = pKey->KeyGetCompare();

bookMarkSize = pEnum->TableBookmarkSize();
               }
15             ++nChild;

CollectProcedureFiles(var.GetObjectRef());
            }
20       }
         pEnum->TableSkip(1);
      } if (bContainer) {
25       if (SUPPORTS(pObjSupports,IFormProps) != NULL) {
            if (GetGenerateSetProc()) {
               GenerateSetProcedure(indentBuf);
            }
         }
30    } int childSize = bookMarkSize + keySize;
35    BYTE *sortedChildren = new BYTE[nChild * childSize];
      BYTE *pSortedItem = sortedChildren;

pEnum->TableGoTop();

40    while (!pEnum->TableEOT()) {
         var.Clear();
         pEnum->EnumGetName(nameBuf,64);
         flags = pEnum->EnumGetFlags();

45       // accumulate children controls if ( pEnum->EnumQueryChild() && pEnum->EnumQueryStream() ) {
         //if ( pEnum->EnumQueryChild() ) {

50          pEnum->EnumGetValue(&var);
```

45
```
                   Bool bOK = TRUE;
                   IQueryStream *pQueryStream = SUPPORTS(var.GetObjectRef(),
        IQueryStream);
                   if (pQueryStream != NULL) {
                      bOK = pQueryStream->QueryStreamStreamAsChild();
                   }
                   if (bOK) {
                      IKey *pKey = SUPPORTS(var.GetObjectRef(),IKey);
                      assert(pKey);
                      assert(tstrcmp(pKey->KeyGetType(),keyType) == 0);

// build key/value
                      pKey->KeyGetKey(pSortedItem);
                      pEnum->TableGetBookmark(pSortedItem + keySize);
                      pSortedItem += childSize;
                   }
               }
               else if ( pEnum->EnumQueryStream() ) {
                  pEnum->EnumGetValue(&var);
                  if (!((var.IsFunctionPtr()) && !GetGenerateFunctionPtrs())) {
                     if(bPrior){
                        if(!bContainer){
                           pStream->StreamWrite(TEXT(",;"),2);
                        }
                        pStream->StreamWriteTextLineNL(msgNoMessage);
                     }
                     else {
                        if (!bContainer) {
                           defineLineBuf += msgSemicolon;

pStream->StreamWriteTextLineNL(defineLineBuf.GetBuffer(1));

pStream->StreamWriteTextLineNL(propertyLineBuf.GetBuffer(1));

}
                     }
                     bPrior = TRUE;
                     FormatDbCode(lineBuf,nameBuf,&var,indentBuf, bContainer);
                     pStream->StreamWriteTextLine(lineBuf.GetBuffer(1));
                  }
               } pEnum->TableSkip(1);
           }

// no properties ?
           if ( (!bPrior) && (!bContainer) ) {
              pStream->StreamWriteTextLineNL(defineLineBuf.GetBuffer(1));
           } pStream->StreamWriteTextLineNL(msgNoMessage);
```

46

```
            qsort(sortedChildren, nChild, childSize,
                (int (_cdecl *)(const void *,const void *))pfCompare);

pSortedItem = sortedChildren;
 5          for (int i = 0; i < nChild; ++i) {
                bookMark = pSortedItem + keySize;
                pEnum->TableGoBookmark(bookMark);

pEnum->EnumGetName(nameBuf,64);
10              var.Clear();
                pEnum->EnumGetValue(&var);
                ISupports *pSupports = VAR_OBJECT_POBJECT(&var);
                Bool bOK = TRUE;
                IQueryStream *pQueryStream = SUPPORTS(pSupports, IQueryStream);
15              if (pQueryStream != NULL) {
                    bOK = pQueryStream->QueryStreamStreamAsChild();
                }
                if (bOK) {
                    StreamCurrentObject(pSupports, nameBuf, indent,
20      ofName.GetBuffer(1));
                }
                pSortedItem += childSize;
            }

25          delete [] sortedChildren;
            var.Clear();
        }

//
30      // Free the enumerator if we got one.
        //
        if( pEnumSupports ){
            pEnumSupports->SupportsRelease();
        }
35      } void StreamMenu(ISupports *pSupports, String name)
        {
            CString menuName = name;
40          CTextFileStream menuStream;
            CFileException fileException;

if (FindExtension(name) == NULL) {
                menuName += TEXT(".MNU");
45          } if (menuStream.StreamOpen(menuName.GetBuffer(0),
                            CFile::modeCreate | CFile::modeReadWrite,
        &fileException)) {
50              StreamObject( pSupports,(ITextFileStream*) &menuStream,
        TEXT("temp"),0, NULL);
```

```
              menuStream.StreamWriteTextLineNL(TEXT("ENDCLASS"));
              menuStream.StreamClose();
          }
          else {
              Error( TranslateFileError(fileException.m_cause,CFile::modeCreate |
          CFile::modeReadWrite),
                      menuName.GetBuffer(0) );
          }
      } void ExecuteClipboard(String pData, CWnd *pWin)
      {
      //--------------------------------------------------------------------------
      //
      // ExecuteClipboard
      //
      // Passed:
      //      String pData    data stream that was retrieved from the clipboard
      //      CWnd *pWin      current form.  Need to create 'THIS' variable
      //                      required to instantiate controls
      // Description:
      //    Excutes the clipboard data as a program by:
      //      1) Copies pData to a program file, clip.tmp   (needed by compiler).
      //      2) Creates a codeblock of the form {DO clip.tmp}.
      //      3) Executes codeblock using 'THIS' obtained from pWin.
      //
      // Returns:
      //    nothing
      //
      // Notes:
      //      Need to add better error handling for stream exceptions and
      //      memory exceptions.
      // Side Effects:
      //
      // Written By:
      //
      //--------------------------------------------------------------------------
          CMemTextFileStream stream;

int size = tstrlen(pData)+1;
          String pBuf = stream.GetBufferSetLength(size);
          memcpy(pBuf,pData,size);

tchar clipFileName[80];
          tstrcpy(clipFileName,TEXT("clip.tmp"));

CTextFileStream outStream;
          CFileException fileException;
```

48

```
        if (!outStream.StreamOpen(clipFileName,CFile::modeCreate |
    CFile::modeReadWrite,
                                    &fileException)) {
            Error( TranslateFileError(fileException.m_cause,CFile::modeCreate |
 5      CFile::modeReadWrite),
                        clipFileName);
        } pBuf = new tchar[1025];
10      stream.StreamSeekToBegin();
        while (!stream.StreamIsEOF()) {
            stream.StreamReadTextLine(pBuf, 1024);
            outStream.StreamWriteTextLineNL(pBuf);
        }
15      outStream.StreamClose();

// Now run the program

20      // 1) Create 'this' variable
        ISupports *pSupports = pWin->GetBDispatch(TRUE);

// 2) Create a codeblock to execute the clipboard program
        CString line = TEXT("{;DO ");
25      line += clipFileName;
        //line += "}";
        line += TEXT(" with this}");
        tchar *icodeBuffer = new tchar[RUN_ICODE_TEXT_DATA_SIZE];
        VarRefType var = ExprParseAndEvaluate(
30          line.GetBuffer(0), icodeBuffer);
        delete [] icodeBuffer;

// 3) clean up
        int32 code = (int32) VAR_CODEBLOCK_CODE(var);
35
        if ( runExprErrorCode != 0 ) {
    #if 0
            ::DisplayErrorMessage(runExprErrorCode, errorArgument, pWin);
    #else
40          ::DisplayErrorMessage(runExprErrorCode, errorArgument.GetBuffer(0),
    pWin);
    #endif
        }
        else {
45          GetDbaseSchedule()->ScheduleRunImmediate(pSupports,code,0,NULL);
            GetMemBlockManager()->DeleteMemoryBlock( (tchar*) code);
        } delete [] pBuf;
50
        if (FileExist(clipFileName)) {
```

49

```
            CFile::Remove(clipFileName);
        }
        clipFileName[tstrlen(clipFileName)-1] = TEXT('O');
        if (FileExist(clipFileName)) {
            CFile::Remove(clipFileName);
        }

}

Bool FindObjectNameInParent(ISupports *pSupports, String nameBuf, int
nameBufSize)
{
//----------------------------------------------------------------------------
//
// FindObjectNameInParent
//
// Passed:
//      ISupports *pSupports    Supports Ptr of the child object
//      String nameBuf          Buffer in which to place name
//      int nameBufSize         Size of nameBuf (include terminator)
//
// Description:
//      Looks in the parent of the object associated with pSupports and
//      enumerates its contents.  If a variable within the parent is found
//      that matches pSupports, its name, as it appears in the parent, is
//      copied to nameBuf.
//
// Returns:
//   TRUE      When object is found in its parent
//   FALSE     When object either (a) has no parent or (b) no reference
//             exists in the parent to object (pSupports).
//
// Notes:
//      This routine will find the first reference to the passed object.
There
//      may be several.
//
// Side Effects:
//
// Written By:
//
//----------------------------------------------------------------------------

Bool bFound = FALSE;
    IControlProps2 *pControlProp = SUPPORTS(pSupports,IControlProps2);
    IControlAggregateProps *pAgProp =
SUPPORTS(pSupports,IControlAggregateProps);
```

50

```
        if (pControlProp != NULL && pAgProp != NULL) {
            ISupports* pParentSupports = pAgProp->PanelObjectGetParentObject();

IBDispatch *pDispatch = SUPPORTS(pParentSupports,IBDispatch);

if (pDispatch != NULL) {
                ISupports *pSupports2 = BDispatchCreateEnumerator(pDispatch);
                IEnumProps *pEnum = SUPPORTS(pSupports2,IEnumProps);
                if (pEnum != NULL) {
                   VarType var;
                   var.Init();

pEnum->TableGoTop();
                   while ( (!pEnum->TableEOT()) && (!bFound) ) {
                      EPROP_FLAGS flags = pEnum->EnumGetFlags();
                      if (flags & EPROP_DBASE) {
                         var.Clear();

pEnum->EnumGetValue(&var);
                         pEnum->EnumGetName(nameBuf,nameBufSize);

if ( (var.IsObjectRef()) &&
                              (VAR_OBJECT_POBJECT(&var) == pSupports) ) {
                            bFound = TRUE;
                         }
                      }
                      pEnum->TableSkip(1);
                   }
                   var.Clear();
                }
            }

}
        return(bFound);
    } if 0
    #include "fninit.h"
    static int _pascal StreamObj(ISupports *pObj, String name) { if 0
        IBDispatch *pDispatch = (IBDispatch *)pObj->Supports(iid_IBDispatch);

if (pDispatch){
        }
        #endif

StreamMenu(pObj,name);

return(0);
    }
```

51

```
FN_EXTERN( TEXT("STREAM"), StreamObj, 3) =  {eetWord,eetObject,eetZString};
#endif
```

52

```
   //
   // $Revision:   1.12  $
   //
 5 // IStreamObject interface
   // ifndef __ISTREAMO_H__
   #define __ISTREAMO_H__
10 #ifndef __ISUPPORT_H__
   #include "isupport.h"
   #endif ifndef __NEWTYPES_H__
15 #include "newtypes.h"
   #endif interface IStreamObject
   {
20     virtual void StreamObjectSaveAsCustom(String className, String fileName,
           ISupports* pSupports, CWnd *parent, BOOL bObjectProceeduresOnly, BOOL
   bSafety)=0;
       virtual void StreamObjectStream(ITextFileStream *pStream,
           ISupports *pObjSupports, String className)=0;
25     virtual void StreamObjectSetIndent(int amount)=0;
       virtual void StreamObjectStreamInstance(ITextFileStream *pStream,
   ISupports *pObjSupports,  String className, String parentName)=0;
       virtual void StreamObjectStreamClass(ITextFileStream *pStream, ISupports
   *pObjSupports,  String className)=0;
30     virtual void StreamObjectSetAnonomous(Bool bVal)=0;
       virtual void StreamObjectSetCustom(Bool bVal)=0;
       virtual void StreamObjectSetGenerateHeaderComment(Bool bVal)=0;
       virtual void StreamObjectSetGenerateSetProc(Bool bVal)=0;
       virtual void StreamObjectSetGenerateFunctionPtrs(Bool bVal)=0;
35     virtual void StreamObjectSetGenerateInstantiateObject(Bool bVal)=0;
       virtual void StreamObjectSetBaseClass(String pName)=0;
       virtual void StreamObjectDestroy()=0;
   };

40 ISupports *MakeStreamObject();

#endif
```

What is claimed is:

1. In a system for developing applications programs, said system having a processor, a memory, and a storage device, a method for generating program code for an application program, the method comprising:
   (a) displaying a design surface having a form, said design surface including a plurality of types of objects which can be placed on said form to create said application program;
   (b) receiving user input for visually placing desired ones of said types of objects on said form;
   (c) in response to step (b), creating in-memory objects of the type desired by the user, said in-memory objects including display methods which support design-time display of said objects at said design surface and further including streaming methods which support storage of a source code representation of said objects on said storage device;
   (d) in response to step (c), invoking said display methods of said in-memory objects, so that visual representation of said objects appear at said design surface;
   (e) receiving user input requesting automated generation of source code for at least some of the objects that have been placed on the form; and
   (f) in response to step (e), generating source code for at least some of the objects that have been placed on the form by invoking said streaming methods of at least some of said in-memory objects, so that a source code representation of those objects is automatically generated by the system as a source file for storage on said storage device.

2. The method of claim 1, wherein said types of objects include user interface controls.

3. The method of claim 2, wherein said user interface controls include menus, pushbuttons, and scroll bars.

4. The method of claim 1, wherein said streaming methods of an object include steps for generating a textual representation of the object.

5. The method of claim 1, wherein said display methods of an object include steps for generating a visual representation of the object on a screen device.

6. The method of claim 1, further comprising:
   (g) receiving a user request to further modify said objects visually; and
   (h) in response to step (g), performing the steps of:
      (i) executing said source file so that said objects are re-created in-memory; and
      (ii) posting a message to said objects to design themselves, so that a visual representation of said objects is again displayed at said design surface.

7. The method of claim 1, wherein said textual representation of said objects comprises program code necessary for re-creating said objects in-memory.

8. The method of claim 1, wherein said textual representation of said objects include class definitions of said objects.

9. The method of claim 8, wherein said textual representation further include steps for instantiating said objects from said class definitions.

10. The method of claim 1, wherein said user input in step (b) includes input from a user input device for selecting a particular object type and placing an object of that type at a particular position on said form.

11. The method of claim 10, wherein said user input comprises input received from a pointing device in response to operation by a user.

12. The method of claim 1, wherein said user input comprises user input for changing properties of at least one of said in-memory objects.

13. The method of claim 12, wherein said user input for changing properties of at least one of said in-memory objects comprises user input for changing appearance at least one of said in-memory objects which is displayed.

14. The method of claim 1, further comprising:
   in response to a user request, executing said program code generated for said application program, said application program executing under control of an end user.

15. The method of claim 1, further comprising:
   receiving user input for editing said source code representation so as to modify said objects;
   receiving a user request for further visually designing said objects; and
   repeating steps (c) and (d), so that visual representation of said objects, as modified, appears at said design surface.

16. In a development system, an improved method for creating an application program, the method comprising:
   (a) providing different classes of objects for placement on a form displayed on screen at design time using graphical user interface technique, each object being created from a particular class of objects and being suitable for use at both design time and at runtime, each class providing display methods for representing objects of that class on screen both at design time and at runtime;
   (b) at design time, receiving a first request from a user for placing a particular object on said form;
   (c) in response to said first request;
      (i) creating from the class of the particular object an instance of the particular object in memory;
      (ii) sending a message to the particular object to display itself; and
      (iii) in response to said message, invoking the display methods of the particular object's class, for providing a visual representation of the particular object on screen at design time;
   (d) during design time, receiving user input for modifying properties of said particular object;
   (e) upon the user concluding design, streaming the particular object out to a storage device as a source code representation of the particular object;
   (f) compiling said source code representation of the particular object into a compiled application program;
   (g) receiving a second request from an end user for executing said compiled application program; and
   (h) in response to said second request;
      (i) creating from the class of the particular object an instance of the particular object in memory;
      (ii) sending a message to the particular object to display itself; and
      (iii) in response to said message, invoking the display methods of the particular object's class, for providing a visual representation of the particular object on screen at runtime;
   wherein said particular object is responsible for displaying itself both at design time and at runtime.

17. The method of claim 16, wherein said different classes of objects comprise classes for various user interface objects.

18. The method of claim 16, wherein step (c) further comprises:
   sending a message to the particular object to design itself; and
   in response to said message to the particular object to design itself, invoking methods of the particular object's class, for entering a design mode for modifying the particular object at design time.

19. The method of claim 16, further comprising:

sending a message to the particular object to stream itself to a storage device, for writing to the storage device a textual representation of the particular object; and in response to said message to the particular object to stream itself to a storage device, streaming said particular object to the storage device by saving a current state of the particular object as a textual representation in a disk file.

20. The method of claim 19, wherein the current state of said particular object includes object properties represented in memory as a series of name/value pairs for the object.

21. The method of claim 19, wherein said textual representation comprises source code of the application program which is necessary for recreating said particular object in-memory, as modified by the user at design time.

22. The method of claim 21, wherein said source code includes a class definition of the particular object's class.

23. The method of claim 21, wherein said source code includes a textual representation of said name/value pairs for the object.

24. The method of claim 16, wherein step (d) includes:

displaying a property inspection dialog for receiving user input for setting properties of all objects;

querying the particular object for enumerating specific properties supported by the particular object; and displaying at said property inspection dialog the specific properties supported by the particular object.

25. The method of claim 24, wherein said property inspection dialog has no knowledge about the properties of the particular object prior to the particular object being queried for its specific properties.

26. A computer system with visual development tools supporting source code generation for a computer program being developed, the system comprising:

a computer having a processor and a memory;

means for designing an application program by displaying a user interface that allows a user to visually place actual objects of different classes from the computer program on a form on screen and modify properties of those objects, each class comprising class methods; and means for rending a particular object that is an actual object from the computer program on screen at both design time and at runtime, including:

means for supporting a design-time view of the particular object, by posting a message to the particular object to display itself during design time; and means for supporting a runtime view of the particular object, by posting a message to the particular object to display itself during runtime;

wherein said means for supporting a design-time view and a runtime view of the particular object invokes a particular display method of the particular object's class.

27. The system of claim 26, wherein said means for designing an application program includes:

an input device for selecting an object of a certain class and positioning that object on the form.

28. The system of claim 26, wherein said means for designing an application program by placing objects of different classes on a form on screen includes:

means for creating at design time in-memory instances of the objects of different classes which are placed on the form.

29. The system of claim 28, wherein each instance of an object created at design time has, during design time, access for invoking the class methods for its class.

30. The system of claim 26, further comprising:

means for rending the particular object as a textual representation on disk, including means for invoking at least one streaming method for streaming the particular object to disk as program code necessary for recreating said particular object in-memory.

* * * * *